(12) United States Patent
Arneson et al.

(10) Patent No.: US 7,009,496 B2
(45) Date of Patent: Mar. 7, 2006

(54) METHOD AND SYSTEM FOR OPTIMIZING AN INTERROGATION OF A TAG POPULATION

(75) Inventors: Michael R. Arneson, Westminister, MD (US); William R. Bandy, Gambrills, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 202 days.

(21) Appl. No.: 10/403,019

(22) Filed: Apr. 1, 2003

(65) Prior Publication Data

US 2003/0214389 A1 Nov. 20, 2003

Related U.S. Application Data

(60) Provisional application No. 60/368,526, filed on Apr. 1, 2002.

(51) Int. Cl.
   *H04Q 5/22* (2006.01)
(52) U.S. Cl. .................. 340/10.2; 235/377; 340/10.32
(58) Field of Classification Search ............... 340/10.2, 340/10.32, 33, 34, 10.4, 10.5, 5.92; 235/385, 235/377; 370/329, 437, 462, 458
   See application file for complete search history.

(56) References Cited

U.S. PATENT DOCUMENTS

| | | |
|---|---|---|
| 3,520,406 A | 7/1970 | Turner |
| 3,689,885 A | 9/1972 | Kaplan et al. |
| 4,225,953 A | 9/1980 | Simon et al. |
| 4,418,411 A | 11/1983 | Strietzel |
| 4,471,345 A | 9/1984 | Barrett, Jr. |
| 4,495,496 A | 1/1985 | Miller, III |
| 4,533,871 A | 8/1985 | Boetzkes |
| 4,598,275 A | 7/1986 | Ross et al. |
| 4,636,950 A | 1/1987 | Caswell et al. |
| 4,656,463 A | 4/1987 | Anders et al. |
| 4,862,160 A | 8/1989 | Ekchian et al. |
| 4,931,788 A | 6/1990 | Creswick |
| 5,030,807 A | 7/1991 | Landt et al. |
| 5,124,699 A | 6/1992 | Tervoert et al. |
| 5,214,409 A | 5/1993 | Beigel |
| 5,245,534 A | 9/1993 | Waterhouse et al. |
| 5,266,925 A | 11/1993 | Vercellotti et al. |
| 5,289,372 A | 2/1994 | Guthrie et al. |
| 5,313,052 A | 5/1994 | Watanabe et al. |
| 5,365,516 A | 11/1994 | Jandrell |
| 5,365,551 A | 11/1994 | Snodgrass et al. |

(Continued)

FOREIGN PATENT DOCUMENTS

EP   0 467 036   5/1991

(Continued)

OTHER PUBLICATIONS

Wade, Will, "Micron To Acquire ID Tech ID Micro", Electronic News (1991), Sep. 1, 1997, p. 16.

*Primary Examiner*—Michael Horabik
*Assistant Examiner*—William Bangachon
(74) *Attorney, Agent, or Firm*—Sterne, Kessler, Goldstein & Fox P.L.L.C.

(57) ABSTRACT

A method and system for optimizing an interrogation of a tag population that includes a plurality of tags, wherein each of the plurality of tags is assigned a tag address includes determining a tag population size; selecting one of a plurality of efficiency profiles that matches the determined tag population size; and defining a plurality of interrogation read cycles according to the selected efficiency profile.

26 Claims, 18 Drawing Sheets

U.S. PATENT DOCUMENTS

| | | |
|---|---|---|
| 5,390,360 A | 2/1995 | Scop et al. |
| 5,410,315 A | 4/1995 | Huber |
| 5,420,577 A | 5/1995 | Kim et al. |
| 5,430,441 A | 7/1995 | Bickley et al. |
| 5,434,572 A | 7/1995 | Smith |
| 5,434,775 A | 7/1995 | Sims et al. |
| 5,444,223 A | 8/1995 | Blama |
| 5,446,447 A | 8/1995 | Carney et al. |
| 5,478,991 A | 12/1995 | Watanabe et al. |
| 5,489,908 A | 2/1996 | Orthmann et al. |
| 5,499,017 A | 3/1996 | Beigel |
| 5,500,650 A | 3/1996 | Snodgrass et al. |
| 5,515,053 A | 5/1996 | Hecht et al. |
| 5,519,381 A | 5/1996 | Marsh et al. |
| 5,528,222 A | 6/1996 | Moskowitz et al. |
| 5,528,232 A | 6/1996 | Verma et al. |
| 5,537,105 A | 7/1996 | Marsh et al. |
| 5,539,394 A | 7/1996 | Cato et al. |
| 5,539,775 A | 7/1996 | Tuttle et al. |
| 5,541,928 A | 7/1996 | Kobayashi et al. |
| 5,550,547 A | 8/1996 | Chan et al. |
| 5,557,280 A | 9/1996 | Marsh et al. |
| 5,566,441 A | 10/1996 | Marsh et al. |
| 5,576,692 A | 11/1996 | Tompkins et al. |
| 5,583,819 A | 12/1996 | Roesner et al. |
| 5,583,850 A | 12/1996 | Snodgrass et al. |
| 5,591,951 A | 1/1997 | Doty |
| 5,627,517 A | 5/1997 | Theimer et al. |
| 5,627,544 A | 5/1997 | Snodgrass et al. |
| 5,640,151 A | 6/1997 | Reis et al. |
| 5,646,607 A | 7/1997 | Shůrmann |
| 5,648,765 A | 7/1997 | Cresap et al. |
| 5,648,767 A | 7/1997 | O'Connor et al. |
| 5,673,037 A | 9/1997 | Cesar et al. |
| 5,680,459 A | 10/1997 | Hook et al. |
| 5,686,888 A | 11/1997 | Welles, II et al. |
| 5,686,902 A | 11/1997 | Reis et al. |
| 5,689,239 A | 11/1997 | Turner et al. |
| 5,742,618 A | 4/1998 | Lowe |
| 5,774,876 A | 6/1998 | Woolley et al. |
| 5,798,693 A | 8/1998 | Engellenner |
| 5,856,788 A | 1/1999 | Walter et al. |
| 5,887,176 A | 3/1999 | Griffith et al. |
| 5,912,632 A | 6/1999 | Dieska et al. |
| 5,917,422 A | 6/1999 | Adamec et al. |
| 5,959,568 A | 9/1999 | Woolley |
| 5,963,133 A | 10/1999 | Monjo |
| 5,995,019 A | 11/1999 | Chieu et al. ............ 340/825.54 |
| 6,025,780 A | 2/2000 | Bowers et al. |
| 6,057,756 A | 5/2000 | Engellenner |
| 6,058,374 A | 5/2000 | Guthrie et al. |
| 6,097,347 A | 8/2000 | Duan et al. |
| 6,215,401 B1 | 4/2001 | Brady et al. |
| 6,354,493 B1 | 3/2002 | Mon |
| 6,388,569 B1 | 5/2002 | Engellenner |

FOREIGN PATENT DOCUMENTS

| | | |
|---|---|---|
| EP | 0 494 114 A2 | 7/1992 |
| EP | 0 496 986 A2 | 8/1992 |
| EP | 0 578 457 A2 | 1/1994 |
| EP | 0 585 132 A1 | 3/1994 |
| EP | 0 598 624 A1 | 5/1994 |
| EP | 0 615 285 A2 | 9/1994 |
| WO | WO 93/05485 | 3/1993 |

METHOD AND SYSTEM FOR OPTIMIZING AN INTERROGATION OF A TAG POPULATION

CROSS-REFERENCE TO RELATED APPLICATIONS

This application claims priority to U.S. Provisional Application No. 60/368,526, titled "Method and System for Optimizing an Interrogation of a Tag Population," filed Apr. 1, 2002, the disclosure of which is incorporated by reference in its entirety.

BACKGROUND OF THE INVENTION

1. Field of the Invention

The present invention relates generally to electronic inventory systems, and more particularly to the use of radio frequency identification (RFID) tags using anti-clash protocols to perform data applications.

2. Description of the Related Art

In modern business, maintaining an accurate inventory of merchandise is crucial. In the past, taking an inventory was an entirely manual process, and therefore slow and expensive. Modern automated inventory systems have improved the accuracy and speed of this process while reducing its cost. With the development of modern manufacturing methods, such as Just-In-Time Delivery, even faster and more accurate inventory methods are required. In some businesses, inventories must be taken almost instantaneously.

One approach to electronic inventory systems is the use of RFID tags. In such systems, an RFID tag is attached to each item to be inventoried. Each tag includes a microprocessor and RF circuitry capable of responding to signals sent from a tag reader. In an ideal inventory system, each tag is assigned a unique tag identification number (Tag ID).

In one such system, the reader transmits a series of clock pulses to the tags. Each clock pulse defines a time slot. Each tag selects a particular time slot using a random number generator and then counts the received time slots. When a given tag's time slot is reached, the tag transmits its Tag ID to the reader. The reader records the received Tag IDs to create an inventory of the tags read.

This approach can suffer from a problem known as "time slot contention." Time slot contention occurs when more than one tag selects the same time slot for Tag ID transmission. When this occurs, the reader is bombarded by more than one tag transmission simultaneously. Because the tag signals interfere with each other, the reader cannot identify the tags.

SUMMARY OF THE INVENTION

The present invention is directed to a method and system for optimizing an interrogation of a tag population that includes a plurality of tags, wherein each of the plurality of tags is assigned a tag address.

A method of the present invention includes the steps of determining a tag population size; selecting one of a plurality of efficiency profiles that matches the determined tag population size; defining a plurality of interrogation read cycles according to the selected efficiency profile; and dynamically optimizing the read cycles.

The present invention advantageously enables tag interrogation applications, such as automatic real time inventory control, to be performed quickly as well as more frequently.

BRIEF DESCRIPTION OF THE FIGURES

The present invention will be described with reference to the accompanying drawings.

DETAILED DESCRIPTION OF THE PREFERRED EMBODIMENTS

1.0 Introduction

The present invention is a system and method for electronic inventory using radio frequency identification (RFID) tags and an anti-clash protocol. The anti-clash protocol solves the above-mentioned problem of time slot contention. The present invention is particularly suited for use in conducting electronic inventories. In particular, the present invention is ideally suited to use for automated real-time inventory control for industries such as distribution and retailing. For example, the present invention enables taking rapid inventories of retail and warehouse items, as well as tracking the location of these items.

The present invention involves the use of an RFID tag that is inexpensive, disposable, and ideally suited to mass production. The RFID tag can be inventoried nearly instantaneously using an unobtrusive, low power radio signal.

Figure 1:
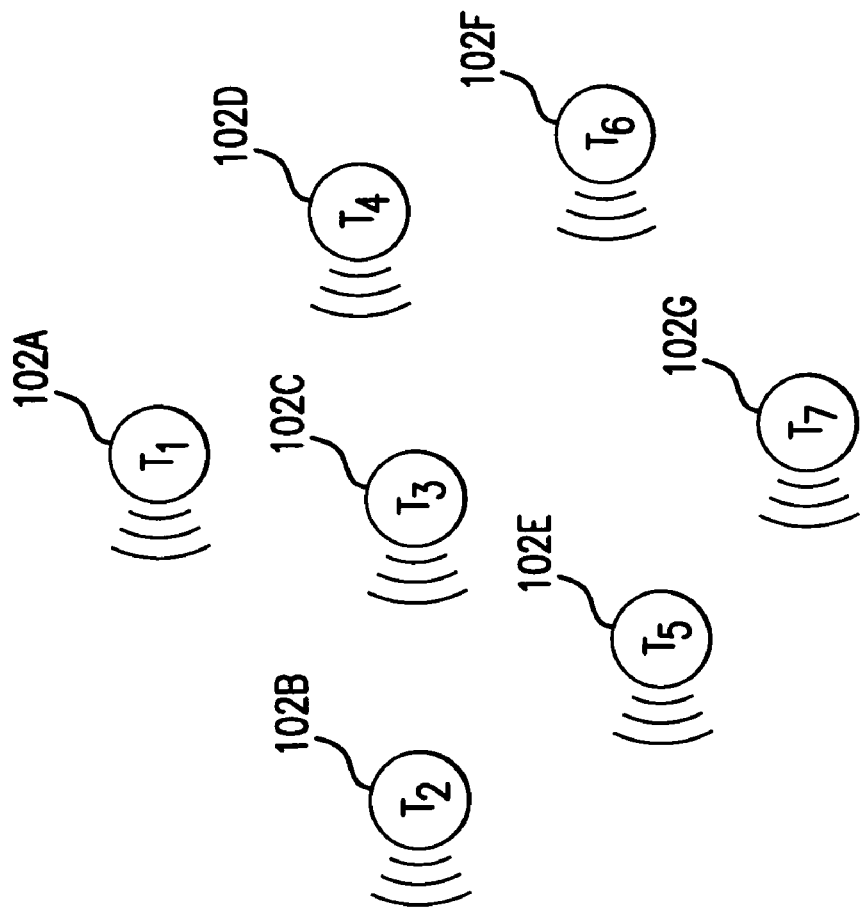
FIG. 1 depicts a tag reader and a plurality of tags according to the present invention for use in an electronic inventory system.
Figure 1:
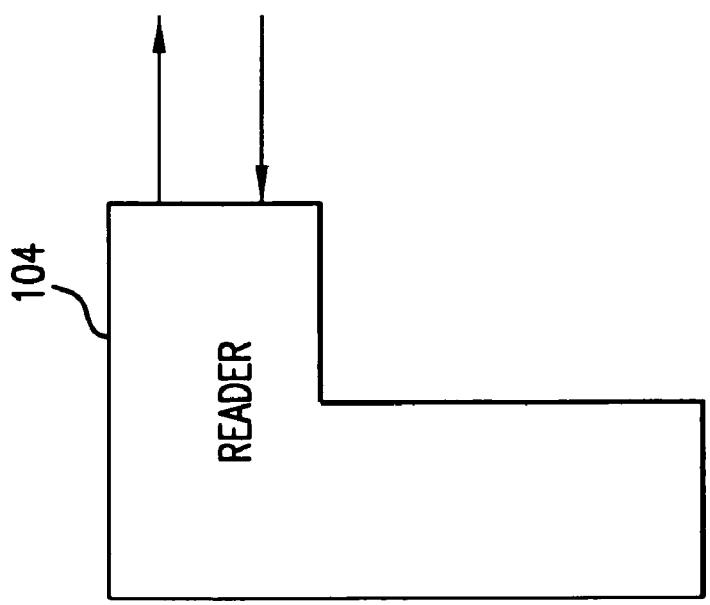

FIG. 1 depicts a tag reader 104 and a plurality of tags 102a–102g for use in an electronic inventory system. In a preferred embodiment of the present invention, each tag is permanently allocated a unique Tag ID. The length of this Tag ID is dependent on the number of tags necessary to adequately cover the inventory. In a preferred embodiment, this assignment takes place at the time of tag manufacture using technologies such as laser-programming or fusible link, which are well-known in the relevant arts. In one embodiment, the Tag ID defines a time slot during which a tag will respond to tag reader 104. The Tag ID can be encrypted for security purposes. In another embodiment, the Tag ID is a separate value, such a universal product code (UPC) that is currently implemented in bar codes and may be combined with a serial number that gives uniqueness for the many products that are in common to a single UPC code. Referring to FIG. 1, tag 102a is assigned to slot $T_1$, tag 102b is assigned time slot $T_2$, and so on.

In one embodiment, the tag is assigned a single Tag ID. This Tag ID can be divided into segments, wherein each segment can be used by a tag reader as described below during interrogation (particularly during a contention resolution process). In an another embodiment, each tag can also be assigned a manufacturer number, representing the identity of the manufacturer of the tag, and a lot number, representing the manufacturing lot of the tag. Thus, the tag is permanently assigned three separate numbers, a Tag ID, a manufacture number and a lot number. Having three separate numbers is obviously the same as concatenating the three numbers together to form a single number. In yet another embodiment, overlapping sections of the Tag ID can be used by the reader during contention resolution (e.g., bits 0–2 during a first read and bits 1–3 during a second read). Again, the size of these number (i.e., the number of bits) is dependent on the specific application and/or inventory.

In a preferred embodiment, this assignment takes place at the time of tag manufacture. For example, the lot number may specify the date and time of manufacture, the wafer number of the integrated circuit on the tag, etc. In a preferred embodiment, the Tag ID, manufacturer number and lot number are laser-programmed into the tag at the time of tag manufacturer. Therefore, these values are permanently fixed at the time of manufacture and cannot subsequently be changed. The manufacturer number and lot number can be encrypted.

Referring to FIG. 1, in a preferred embodiment of the present invention, tag reader 104 emits a series of clock instructions. Each clock instruction defines a time slot. Tags 102 count the time slots and compare them to that programmed. When the time slot count is equivalent to the Tag ID programmed into a tag, the tag transmits its Tag ID to tag reader 104. In this way, tag reader 104 accumulates the Tag IDs of the inventory tags.

Figure 2:
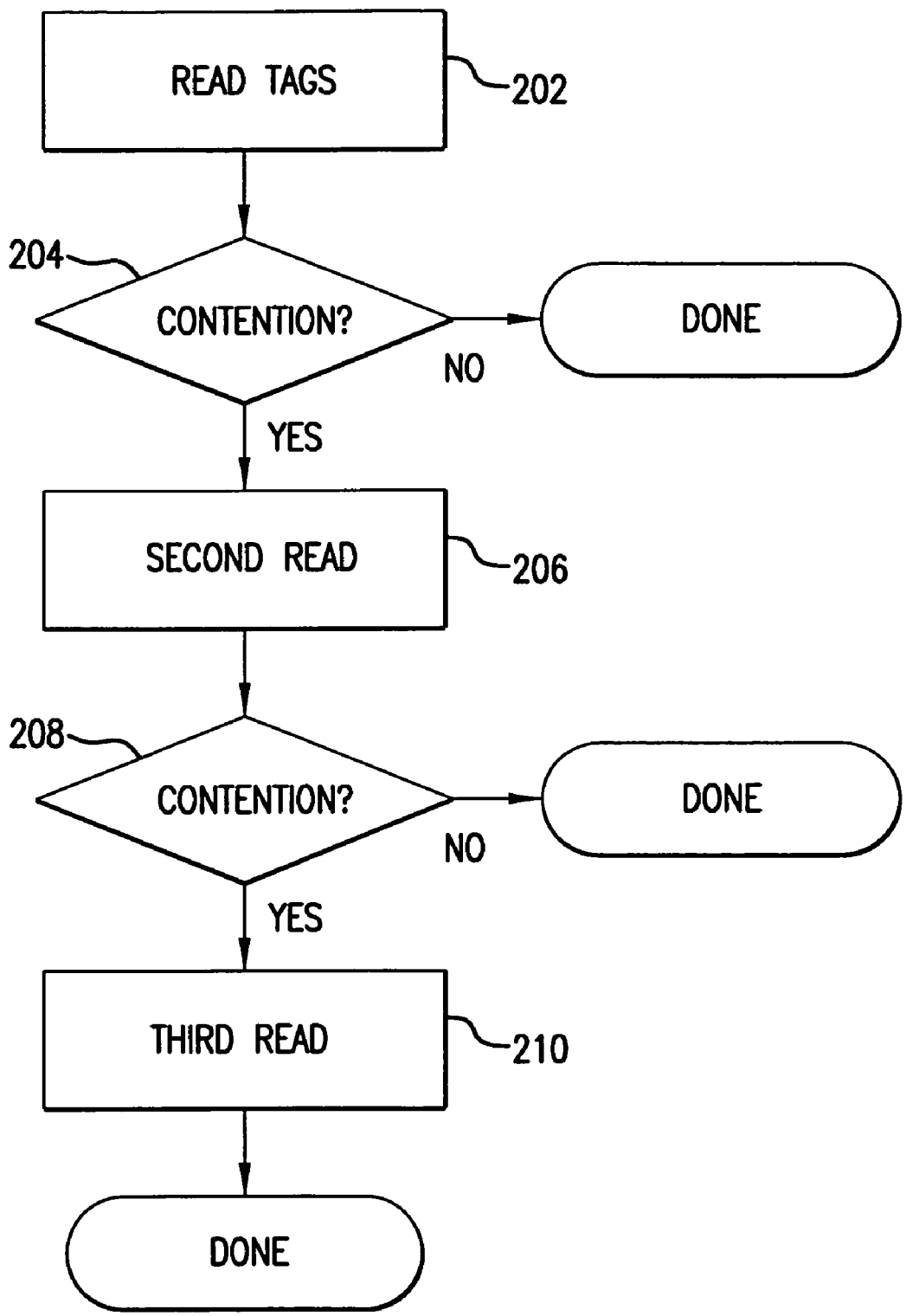
FIG. 2 is a flowchart depicting the operation of the present invention according to a preferred embodiment.

FIG. 2 is a flowchart depicting the operation of the present invention according to a preferred embodiment. The flowchart illustrates the present invention's use of multiple reads and multiple tag identifiers to avoid time slot contention. Referring to FIG. 2, the tags are read for the first time as described above with respect to FIG. 1, and as shown in a step 202. If no time slot contention is detected, as shown by the "no" branch from step 204, then the inventory is complete and accurate.

As described above, time slot contention occurs when multiple tags transmit to the reader in the same time slot. The tag reader can detect this contention in many ways that are well known in the art. For example, each tag could error-code its transmission, for example by using a checksum. When the tag reader receives a tag transmission, it computes a checksum. If two tags transmit simultaneously, the computed checksum will not match the transmitted checksum. When tag reader 104 determines that these checksums do not match, then time slot contention has been detected. Other methods of detecting time slot contention may be employed with the present invention, as would be apparent to one skilled in the art.

If during the first tag read contention was detected, as shown by the "yes" branch from step 204, then a second tag read is performed, as shown in a step 206. While the first tag read was based on Tag IDs, the second tag read is based on a separate value that was permanently programmed into the tag at the time of tag manufacture. In a preferred embodiment, that second value is the manufacturer number of the tag.

During the second read, each contended tag ID is resolved separately. For each contended Tag ID, only those tags that contended for that Tag ID are polled. In the second read cycle, tag manufacturer numbers are used to select the time slot during which the tag will transmit. If no contention is detected in the second read, as shown by the "no" branch from step 208, then the Tag IDs of the tags that contended in the first read have been recorded by the tag reader, and the inventory is complete. However, if time slot contention is detected during the second read, as shown by the "yes" branch from step 208, then a third tag read is performed, as shown in a step 210.

In the third read, each contended manufacturer number is resolved separately. For each contended manufacturer number, only those tags that contended for that manufacturer number are polled. In the third read cycle, a third permanent tag identifier is used to break the contention of the second read. These third identifiers are programmed into each tag at the time of manufacture. In a preferred embodiment, this third value is the lot number of the tag.

In the unlikely event that the third tag read does not resolve all time slot contentions, further similar read operations may be performed without departing from the spirit and scope of the present invention. For example, further tag reads could be based on identification numbers, such as company names or numbers, bar code numbers associated with the item attached to each tag 102, and product identifiers that identify the types of items attached to each tag 102.

Figure 3A:
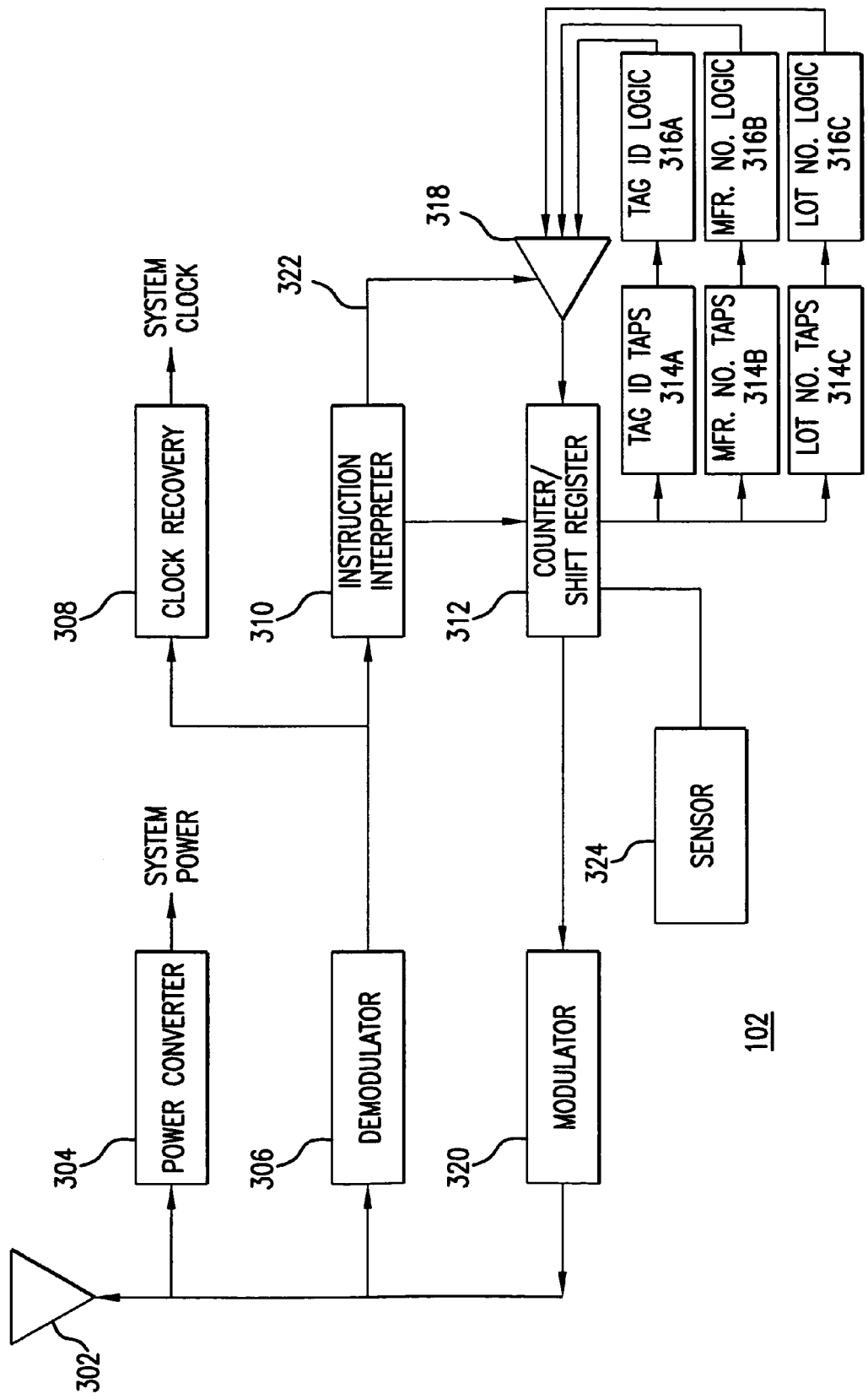
FIG. 3A is a circuit block diagram of an RFID tag according to a preferred embodiment of the present invention.

Now the architecture of the tag is described. FIG. 3A is a circuit block diagram of an RFID tag according to a preferred embodiment of the present invention. The particular circuit of FIG. 3A is presented by way of example only. Other circuits can be employed without departing from the spirit and scope of the present invention, as would be apparent to one skilled in the relevant art. Tag 102 includes at least one antenna 302, a power converter 304, a demodulator 306, a clock recovery circuit 308, an instruction interpreter 310, a counter/shift register 312, a plurality of laser-programmable taps 314a–314c, a plurality of tap decoder logic circuits 316a–316c, a multiplexer 318, and a modulator 320. In a preferred embodiment, antenna 302 is an omnidirectional antenna, with its impedance matched to the frequency of transmission.

In the depicted embodiment, system power for each tag is provided by a charging signal transmitted by the reader prior to the tag reading operation. Power converter 304 is used to convert the received charging signal to system power. Such power converter circuits are well known in the art. In a preferred embodiment, the charging signal need only be present for a short time to fully charge the tags. In an alternative embodiment, power converter 304 is replaced by a battery. In that embodiment, the tag reader 104 is not required to transmit a charging signal.

In an alternate embodiment, power controller 304 is augmented by a storage capacitor. In this embodiment, storage capacitor provides a tag with operating power when it is too far away from the reader to be charged by the charging signal. Also, in an alternate embodiment, power converter can be an energy harvester. Energy harvesting involves capturing RF energy in any portion of the RF spectrum and converting the energy into electrical power signals as opposed to information signals. Energy harvesting is well known to persons skilled in the relevant arts. For a tag 102, energy harvesting properties are determined by the characteristics of antenna 302. A fractal antenna is well suited to both energy harvesting and tag 102 operation, and is well known to persons skilled in the relevant arts.

Demodulator 306 receives signals from tag reader 104 via antenna 302. In a preferred embodiment, the received signals comprise a charging signal and one or more instructions. These instructions are described in detail below. One such instruction includes a count instruction that instructs the tags to increment their counter/shift registers 312. In one embodiment, the count instruction causes counter/shift registers 312 to increment by one; in alternative embodiments, the instruction causes counter/shift registers 312 to increment by other values.

In a preferred embodiment, the instructions are transmitted by tag reader 104 using an amplitude-modulated RF signal using a several hundred kilohertz baud rate and a 900 megahertz carrier frequency. Tag reader 104 may vary the bit rate of these transmissions. For example, tag reader 104 may reduce the bit rate if it senses the existence of a noisy RF environment. The instructions are sent by the reader with a "return to center" data format; this format is well-known in the art. The instructions are decoded by the tag to generate digital input for instruction interpreter 310 and a system clock. The system clock is recovered by clock recovery circuit 308.

Figure 3B:
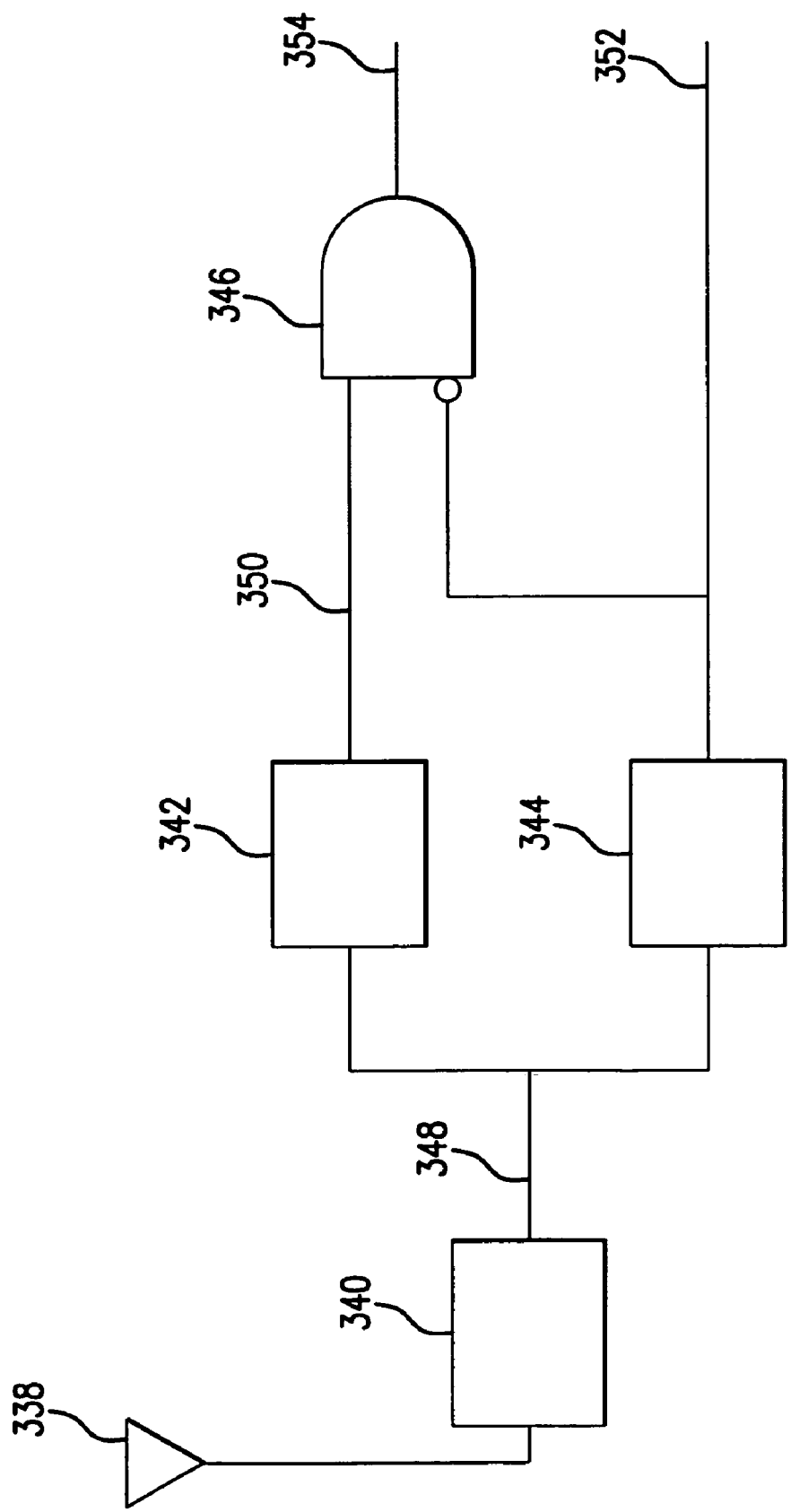
FIGS. 3B–3D illustrate an implementation of a demodulator and clock recovery circuit.

FIG. 3B illustrates an implementation of demodulator 306 and clock recovery circuit 308. This implementation comprises a waveform detector 340, a first detector 342, a second detector 344, and a logic gate 346.

Waveform detector 340 receives an RF signal from antenna 302 and converts this signal into a baseband signal 348. In addition, waveform detector 340 monitors the ambient RF environment. If waveform detector detects spurious RF above an interference threshold, it will wait before outputting a baseband signal 348. Waveform detector 340 can be implemented through RF receiver designs well known to persons skilled in the relevant arts.

Baseband signal 348 comprises a series of pulses, wherein a short pulse represents a logical "0" and an extended pulse represents a logical "1". According to a preferred embodiment, each pulse indicates the transition from a presence of RF energy to an absence of energy in the RF signal received by waveform detector 340. However, in alternate embodiments, the pulses in baseband signal 348 may represent other occurrences in the RF signal.

According to this implementation, a clock signal is generated from a rising edge of each pulse. Baseband signal 348 is input to first detector 342 and second detector 344.

First detector 342 generates a first output signal 350. First output signal 350 comprises an extended pulse for each pulse, whether short or extended, in baseband signal 348. In essence, first detector 342 generates a periodic clock signal comprising a series of extended pulses. Thus, the circuit illustrated in FIG. 3B performs the function of clock recovery circuit 308.

Second detector 344 generates a second output signal 352. Second output signal 352 comprises an extended pulse for each extended pulse in baseband signal 348.

Figure 3C:
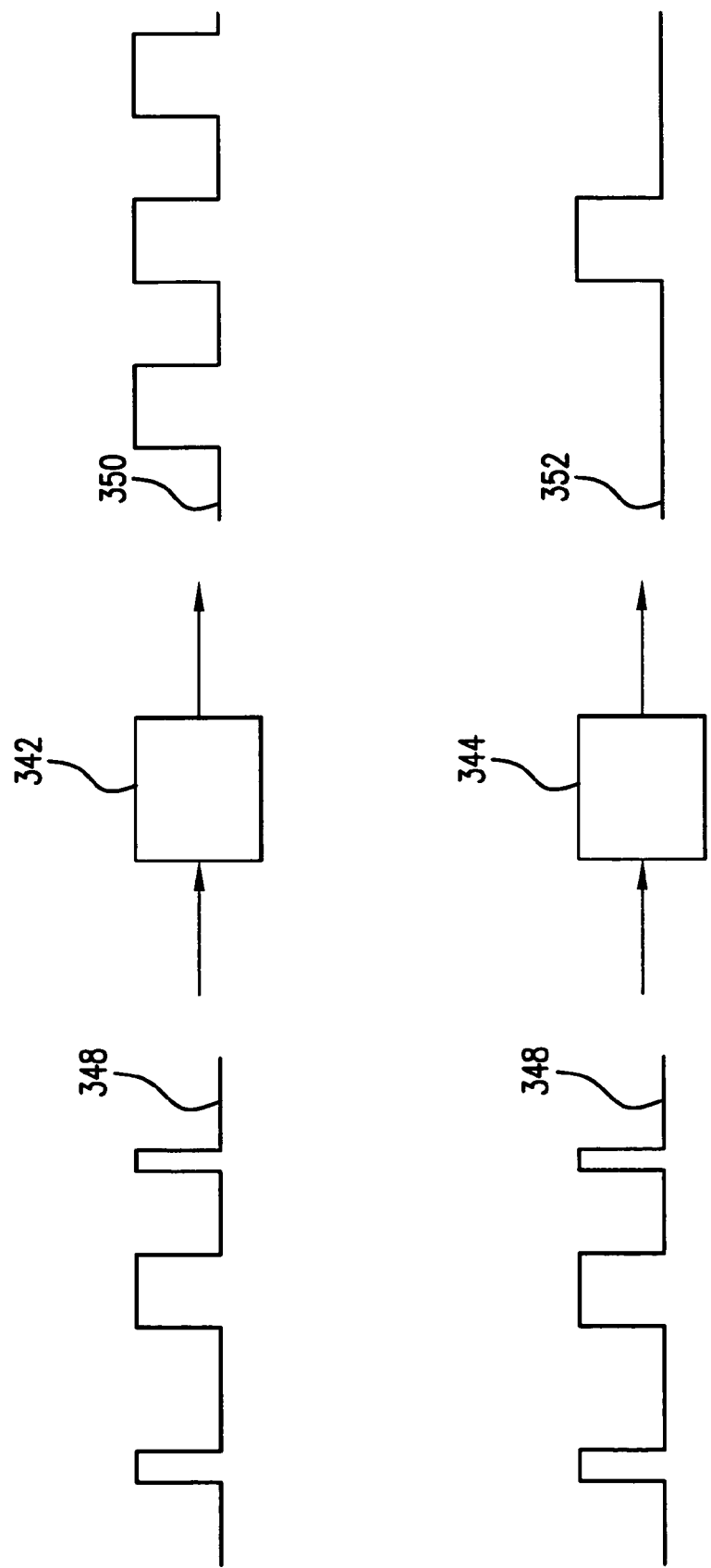

FIG. 3C illustrates an exemplary baseband signal 348 and the corresponding first and second output signals 350–352. As illustrated, this exemplary baseband signal 348 comprises a first short pulse followed by an extended pulse and a final short pulse. In response to baseband signal 348, first output signal 350 and second output signal 352 have different characteristics. First output signal 350 comprises three extended pulses that correspond to each of the pulses in baseband signal 348. As stated above, this signal is a periodic clock signal. Second output signal 352 comprises a single extended pulse that corresponds to the extended pulse in baseband signal 348.

Figure 3D:
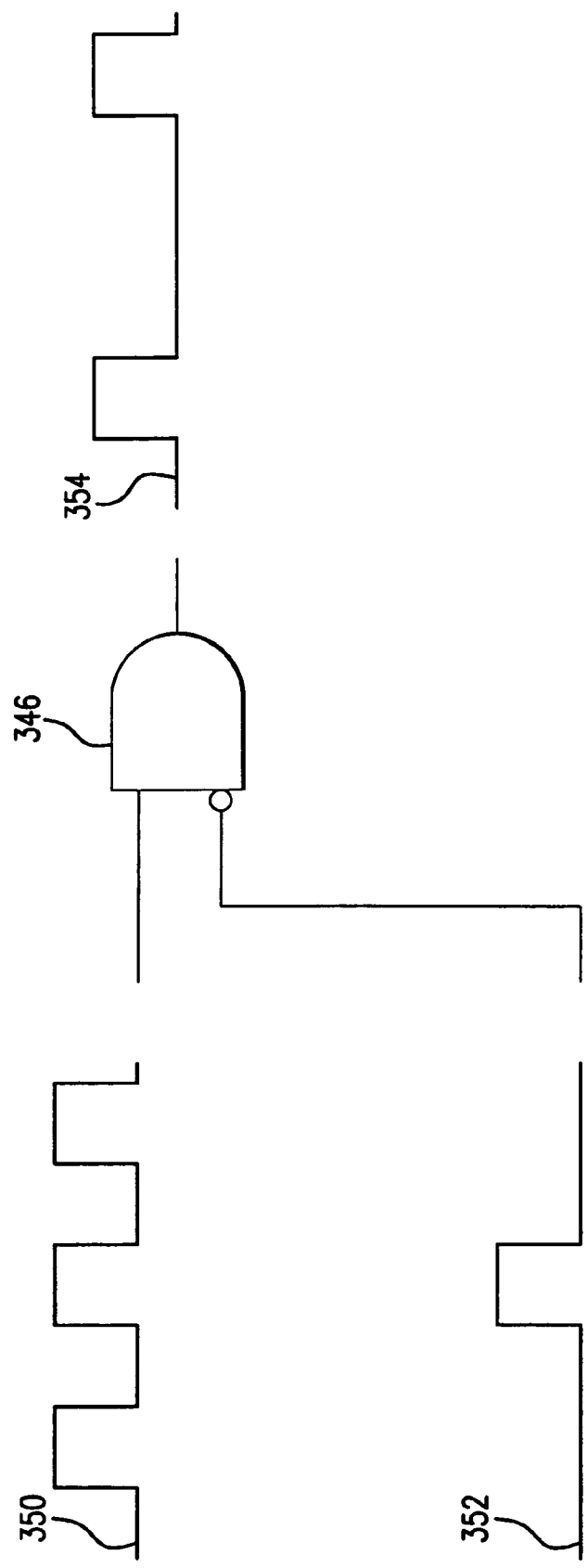

According to the present invention, each pulse in second output signal 352 indicates a logical "1" received from reader 104. In contrast, each pulse in third output signal 354 indicates a logical "0" received from reader 104. Third output signal 354 is generated by inputting first output signal 350 and an inverted second output signal 352 into logic gate 346. In a preferred embodiment, logic gate 346 is an AND gate. Second output signal 352 is inverted according to techniques well known to persons skilled in the relevant arts. FIG. 3D illustrates an exemplary third output signal 354 that corresponds to the exemplary first and second output signals described above. Third output signal 354 comprises a pulse corresponding to the first and third pulses in first output signal 350. In essence, third output signal 354 recovers a logical "0" in baseband signal 348.

Instruction interpreter 310 receives instructions from demodulator 306, and provides control signals and data to counter/shift register 312 and multiplexer 318. Laser programmable taps 314a–314c are permanently programmed with predetermined values at the time of tag manufacture. In a preferred embodiment, taps 314a–314c are programmed by laser-cutting or linking specific output taps of a collection of inverters. As would be apparent to one skilled in the relevant arts, other technologies can be used to permanently program these values without departing from the scope of the present invention. In a preferred embodiment, taps 314a are programmed with the Tag ID, taps 314b are programmed with the tag manufacturer number and taps 314c are programmed with the tag lot number.

Decoder logic circuits 316a–316c are used to monitor the outputs of programmable taps 314a–314c. For example, when the value in counter/shift register 312 is the same as the value programmed into Tag ID taps 314a, Tag ID logic 316a decodes a Tag ID enable signal, which is provided to multiplexer 318.

Control line 322 is used by instruction interpreter 310 to indicate to multiplexer 318 which read cycle is being executed (that is, which permanently-programmed tag value is being tested). For example, during the second read cycle, the manufacturer number is being tested. When the counter/shift register 312 reaches the manufacturer number programmed into manufacturer taps 314b, manufacturer number logic 316b provides an enable signal to multiplexer 318. This enable signal is selected by control line 322 to cause shift register 312 to shift its contents (the Tag ID) to modulator 320 for transmission to tag reader 104.

As will be described below, the second read cycle is initiated by providing a second read instruction to instruction interpreter 310. In response to that instruction, instruction interpreter indicates to multiplexer 318 that the manufacturer number is being tested. In response, multiplexer 318 gates only the manufacturer number enable signal to counter/shift register 312. This enable signal causes counter/shift register 312 to shift the count, which is equivalent to the manufacturer number, to modulator 320 for transmission to the reader. In this way, the manufacturer number of a tag is transmitted to tag reader 104 when the count reaches the manufacturer number. Thus, the time at which the tag transmits during the second read cycle is controlled by the tag manufacturer number. As further described below, this mechanism is used to solve time slot contention problems.

Modulator 320 transmits the data provided by counter/shift register 312 to tag reader 104 via antenna 302 using amplitude-modulated (AM) RF back scatter signals. In a preferred embodiment a several hundred kilohertz baud rate is used with a 900 megahertz carrier frequency. Because the tag system clock is derived from the signal provided by the tag reader, the data sent by the tag to the reader is clock-synchronized with the reader.

In one embodiment, tag 102 also contains one or more sensors 324. Data collected by sensors 324 is routed to counter/shift register 312 each time tag 102 transmits. The sensor data is appended to the tag transmission and recorded by tag reader 104. In one embodiment, sensor 324 is a gas sensor that detects the presence of chemicals associated with drugs or precursor chemicals of explosives, such as methane. A tag equipped with such a sensor is a powerful mechanism for quickly locating items containing contraband or explosives. In another embodiment, sensor 324 is a temperature detector that generates information indicating the ambient temperature of tag 102. In a further embodiment, sensor 324 is an accelerometer that generates information indicating movement and vibration of tag 102. Such sensors are well known to persons skilled in the relevant arts.

An optical sensor is another example of sensor 324. Optical sensors detect the presence (or absence) of light. Certain optical sensors can detect light of certain colors. Color detection enables a tag 102 to perform functions such as monitoring whether a traffic light at a traffic intersection is red, yellow, or green.

Sensor 324 may also be a pressure sensor. Pressure sensors can detect fluid pressure, atmospheric pressure, or any pressure acting on tag 102. Other examples of sensor 324 include an electrical field sensor, a magnetic field sensor, a radiation sensor, and a biochemical sensor. Sensor 324 may be implemented as a microsensor that is produced using integrated circuit fabrication technologies and/or micromachining. Micromachining is a set of processes which produces three-dimensional microstructures using the same photographic techniques and batch processing as for integrated circuits. Micromachining involves producing three-dimensional microstructures using photographic techniques and batch processing methods similar to those used in the production of integrated circuits.

Figure 4:
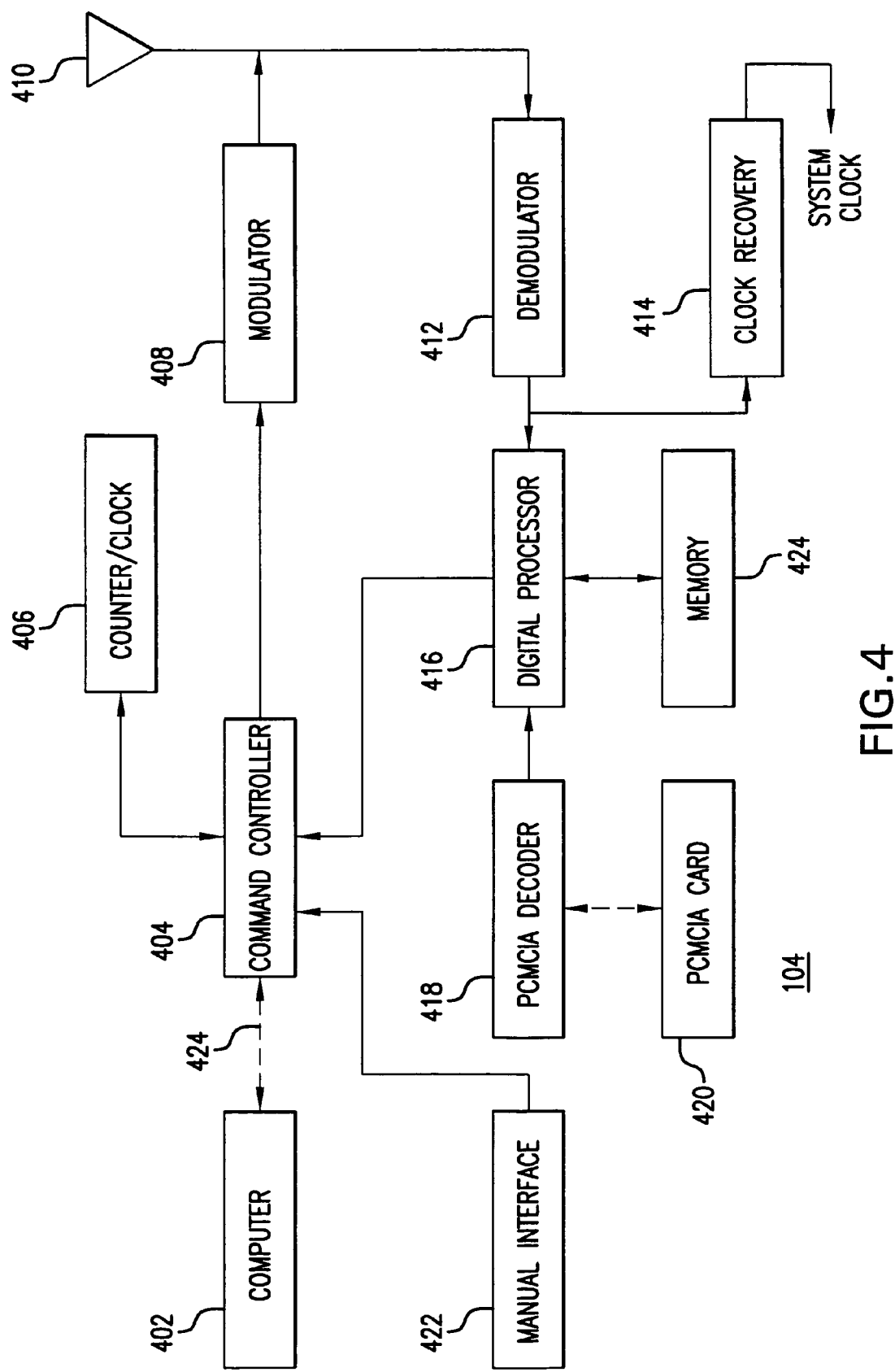
FIG. 4 is a circuit block diagram of the architecture of tag reader 104 according to a preferred embodiment.

The architecture of tag reader 104 is now described. FIG. 4 is a circuit block diagram of the architecture of tag reader 104 according to a preferred embodiment. The circuitry of tag reader 104 is described in three categories: generic circuitry, processing circuitry, and application-specific circuitry.

Referring to FIG. 4, tag reader processing circuitry is represented by computer 402. Computer 402 performs high level processing functions not provided by tag reader generic circuitry. These high level functions include compiling inventory lists, handling time slot contentions, and the like, as would be apparent to one skilled in the relevant arts. Computer 402 may be physically co-located with tag reader 104, as in the case of a stationary tag reader, or may be physically separate from tag reader 104, as may be the case with a hand-held or portable tag reader. The connection 424 between computer 402 and command controller 404 may be hard-wired or wireless.

Application-specific tag reader circuitry is represented by PCMCIA (Personal Computer Memory Card International Association) card 420. In a preferred embodiment, details regarding specific tags, applications, encryption scheme, sensor configuration and data, and modes of operation to be used can be embodied in PCMCIA card 420. In this embodiment, a generic tag reader 104 can be used for multiple inventory applications by merely using different PCMCIA cards.

The remaining circuitry in FIG. 4 comprises tag reader generic circuitry. This is the circuitry required by tag reader 104 to perform generic functions under the control of computer 402 and one or more PCMCIA cards 420. Generic tag reader circuitry includes command controller 404, counter/clock 406, modulator 408, one or more antennas 410, demodulator 412, clock recovery circuit 414, digital processor 416, memory 424, PCMCIA decoder 418, and manual interface 422.

In a preferred embodiment, tag contention is not addressed immediately after it occurs, but rather is resolved in a further read cycle. When a tag contention is detected, tag reader 104 stores the contended time slot number in memory 424. In a further read cycle, tag reader 104 retrieves each contended time slot number from memory 424 for resolution. To keep track of the time slots, tag reader 104 employs a clock/counter 406. Clock/counter 406 responds to the count instructions transmitted by tag reader 104 to tags 102. In this way, the contents of clock/counter 406 are the same as the contents of counter/shift register 312 in each tag 102. Thus, when tag reader 104 detects time slot contention, it can record the contended time slot number by storing the contents of clock/counter 406.

Command controller 404 generates data and instructions under the control of computer 402. These data and instructions are transmitted via modulator 408 and antenna 410 to tags 102. Tag transmissions are received via antenna 410 and demodulator 412 by digital processor 416, which communicates with computer 402 via command controller 404. In one embodiment, a system clock may be derived by clock recovery circuit 414 for use in analyzing tag transmissions. The PCMCIA card 420 is coupled to tag reader 104 via a PCMCIA decoder 418. A manual interface 422 provides the operator with control over the tag reader 104.

2.0 Modes of Operation 2.1 Timed Broadcast Read

Figure 5:
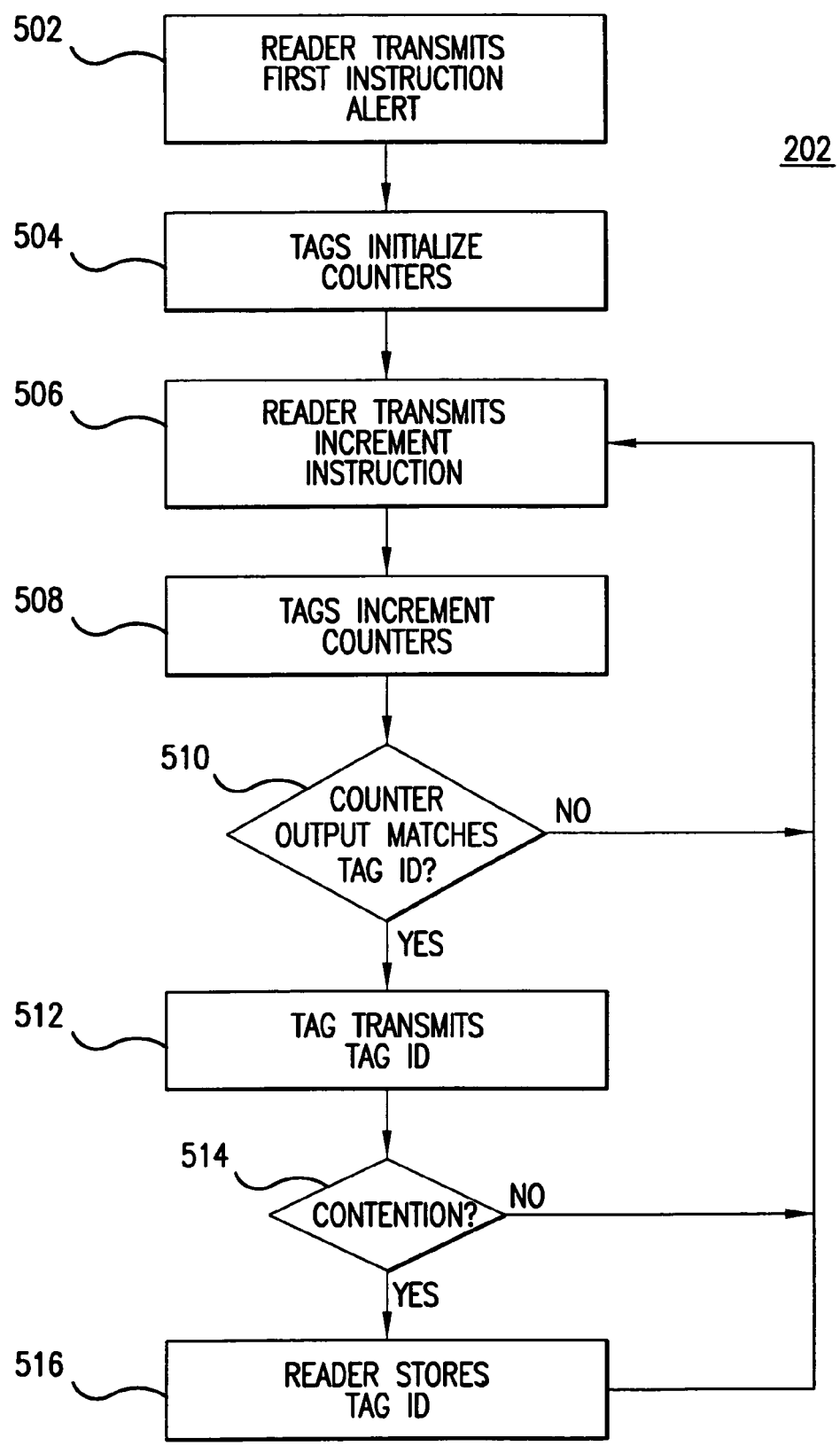
FIG. 5 is a flowchart depicting a first read operation of a timed broadcast read of the present invention.

As described above, the present invention provides at least three modes of operation: timed broadcast read, immediate read, and specific tag read. Timed broadcast read allows an ensemble of tags (from a few to several thousand) to be read within a time frame of a few seconds. FIG. 2 is a high-level flowchart of the timed broadcast read mode of operation of the present invention. FIG. 5 is a flowchart depicting the first read operation of the timed broadcast read of the present invention. During the first read operation, the tag reader steps the tags through a sequence of time slots. When a tag detects that a time slot matches its preprogrammed time slot, the tag transmits its Tag ID. If more than one tag transmits in the same time slot, the tag reader stores the time slot number for future resolution of the time slot contention.

2.1.1 First Read Cycle

Referring to FIG. 5, the timed broadcast read mode of operation begins when the tag reader transmits a first instruction alert to the tags, as shown in a step 502. The first instruction alert signals to the tags that this is the first instruction in the timed broadcast read mode of operation. In response, the tags initialize. In particular, the tags initialize their counters/shift registers 312, as shown in a step 504. The tag reader then repeatedly transmits a clock increment instruction, as shown in a step 506. In response to the increment instruction, each tag increments the count in its counter/shift register 312, as shown in Step 508. When a tag's counter/shift register 312 output matches the Tag ID programmed into Tag ID taps 314*a*, as indicated by the "yes" branch from step 510, the tag transmits its Tag ID as shown in a step 512 and described above. Alternatively, the reader sends out the count number, which each tag uses to compares to its programmed time slot.

In an alternative embodiment, the tag does not transmit its Tag ID, but instead transmits a simple response signal, when a tags counter/shift register 312 output matches the Tag ID programmed into Tag ID taps 314*a*. The response signal need not convey any information describing the identity of the tag. Indeed, the response signal need not convey any information at all. The response signal need only indicate that a tag is present. In this embodiment, tag reader 104 keeps track of the count in the tag counter/shift register 312 by using an internal counter/clock 406. Counter/clock 406 is initialized in step 504, and is incremented in step 508 in response to the transmitted clock instruction. When tag reader 104 receives a response signal, tag reader 104 records the count in counter/clock 406. Because the tag transmitted the response signal when the count in its counter/shift register 312 equaled its Tag ID, and because the counter/clock 406 also contains that count, the presence of the particular tag that transmitted the response signal is recorded by recording the count in counter/clock 406. In a preferred embodiment, the response signal contains sufficient information for tag reader 104 to detect response signal contention when it occurs.

If more than one tag transmits in the same time slot, tag reader 104 detects time slot contention. If time slot contention is detected, as shown by the "yes" branch from step 514, tag reader 104 stores the Tag ID, as shown in a step 516. Tag reader 104 keeps track of the Tag ID using counter/clock 406. Tag reader 104 will use the Tag IDs to resolve the time slot contention for those Tag IDs in a second read cycle, which is described below and corresponds to step 206 in FIG. 2. Alternatively, the reader could immediately resolve the contention.

2.1.2 Second Read Cycle

Figure 6:
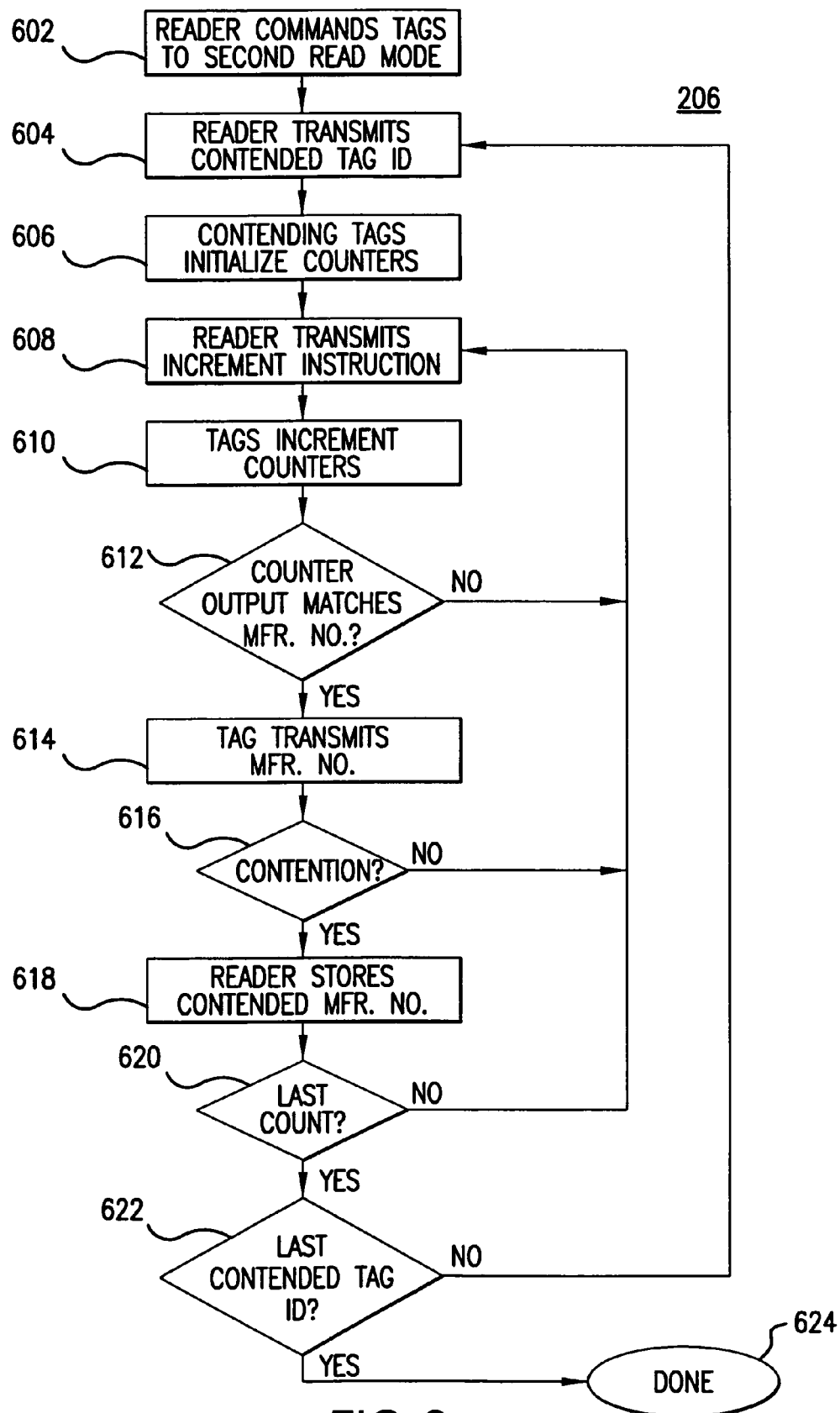
FIG. 6 is a flowchart depicting a second read operation of a timed broadcast read of the present invention.

In a preferred embodiment, the present invention employs a second read cycle to solve time slot contentions that occurred during the first read cycle. FIG. 6 is a flowchart depicting the operation of the present invention in the second read cycle according to a preferred embodiment. During the second read cycle, the system examines contentions for each Tag ID individually. For each contended Tag ID, tag reader 104 causes tags 102 to count in unison. When a tag's count matches its manufacturer number, the tag transmits that manufacturer number. In this way, the tag's manufacturer number controls the time slot during which the tag transmits. Alternatively, the reader can transmit the second read count number, which the tag(s) uses to compare to its programmed time slot. Because it is highly unlikely that more than one tag will have the same Tag ID and manufacturer number, it is unlikely that two tags will transmit in the same time slot during the second read. Therefore, Tag ID contention is resolved by the second read. In the unlikely event that multiple tags have the same Tag ID and manufacturer number, contention can be resolved using a third read cycle, as described below.

Referring to FIG. 6, tag reader 104 initiates the second read cycle by sending a second read mode instruction to tags 102, as shown in a step 602. The reader then transmits a contended Tag ID to the tags, as shown in a step 604. The step permits only those tags that contended for a particular Tag ID to participate in contention resolution for that Tag ID. In response to the transmission of the contended Tag ID, only those tags having that Tag ID initialize their counters/shift registers 312, as shown in a step 606.

Tag reader 104 then transmits the first in a series of increment instructions, as shown in a step 608. In response, the contending tags increment their counter/shift registers 312, as shown in a step 610. When the output of a tag's counter/shift register 312 matches the tag manufacturer number permanently programmed into manufacturer number taps 314*b*, as indicated by the "yes" branch from step 612, the tag transmits its manufacturer number, as shown in a step 614. Alternatively, the reader could send out the count number, which the tag(s) used to compare to its programmed time slot.

In an alternative embodiment, the tag transmits a simple response signal as described above. Tag reader 104 then records the tag's manufacturer number by storing the count in its counter/clock 406, as described above for the Tag ID.

If more than one tag transmits its manufacturer number simultaneously, tag reader 104 detects the contention, as indicated by the "yes" branch from step 616, and tag reader 104 stores the contended manufacturer number for future contention resolution in a third read cycle, as shown in a step 618. Alternatively, the reader could resolve the contention immediately.

Tag reader 104 steps tags 102 through a predetermined range of possible manufacturer numbers. When the last count is reached, as indicated by the "yes" branch from step 620, the process of steps 604 through 618 is repeated for the next contended Tag ID. When the last contended Tag ID has been examined, as indicated by the "yes" branch from step 622, the second read cycle is complete.

2.1.3 Third Read Cycle

Figure 7:
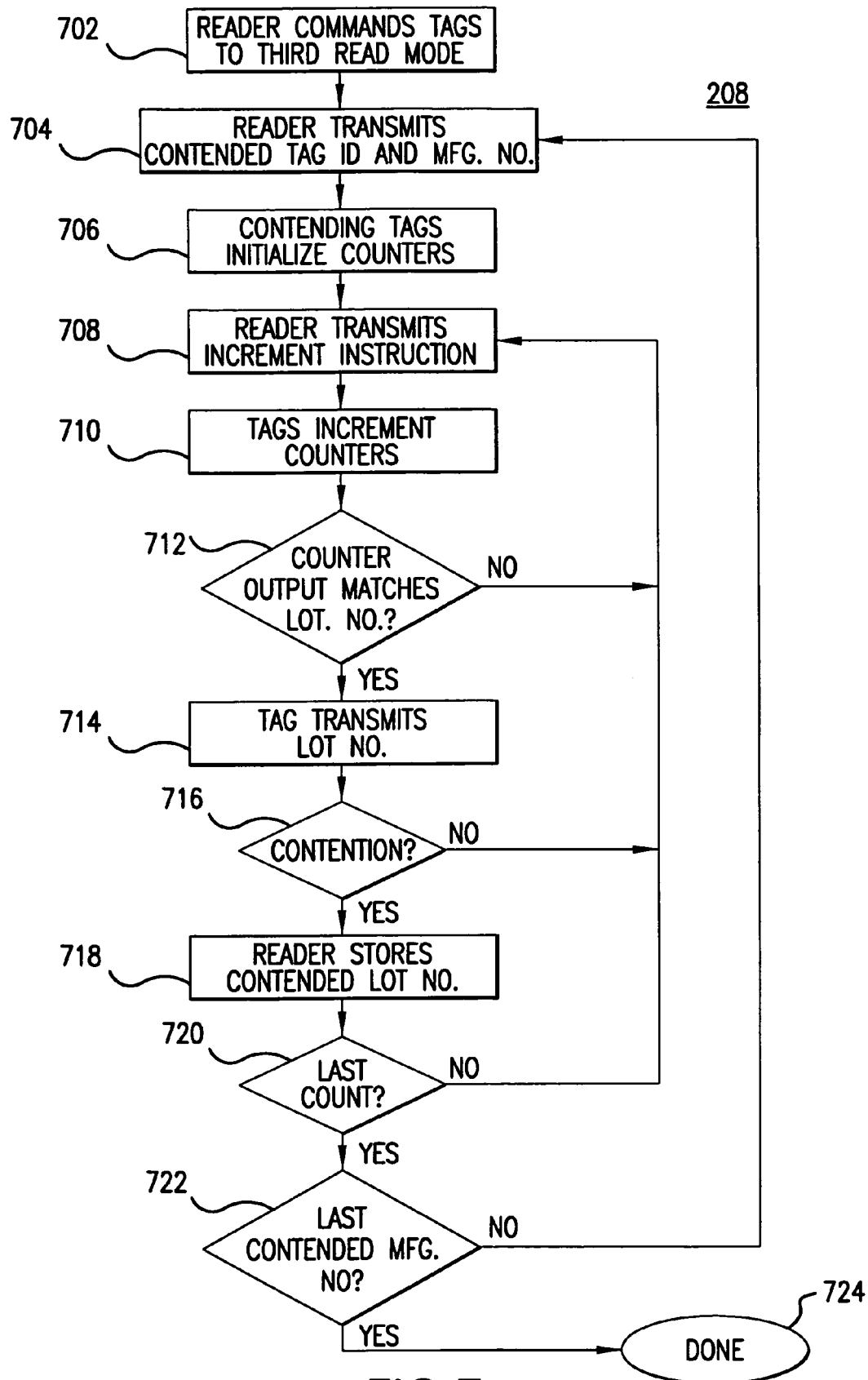
FIG. 7 is a flowchart depicting a third read operation of a timed broadcast read of the present invention.

In one embodiment, the present invention employs a third read cycle to resolve any time slot contentions that occurred during the second read cycle. FIG. 7 is a flowchart depicting the operation of the present invention in the third read cycle according to a preferred embodiment. During the third read cycle, the system examines contentions for each manufacturer number individually.

For each contended manufacturer number, tag reader 104 causes tags 102 to count in unison. When a tag's count matches its lot number, the tag transmits that lot number. In this way, the tag's lot number controls the time slot during which the tag transmits. Because it is highly unlikely that more than one tag will have the same Tag ID, manufacturer number, and lot number, it is extremely unlikely that two tags will transmit in the same time slot during the third read. Therefore, tag manufacturer number contention is resolved by the third read. In the unlikely event that multiple tags have the same Tag ID, manufacturer number, and lot number, contention can be resolved using a further read cycle based on other tag identification data, as would be apparent to one skilled in the relevant art using the above description.

Referring to FIG. 7, tag reader 104 initiates the third read cycle by sending a third read mode instruction to tags 102, as shown in a step 702. The reader then transmits a contended Tag ID and manufacturer number to the tags, as shown in a step 704. This step permits only those tags that contended for a particular Tag ID and manufacturer number to participate in contention resolution for that Tag ID and manufacturer number. In response to the transmission of the contended Tag ID and manufacturer number, only tags having that particular Tag ID and manufacturer number initialize their counters/shift registers 312, as shown in a step 706.

Tag reader 104 then transmits the first in a series of increment instructions, as shown in a step 708. In response, the contending tags increment their counter/shift registers 312, as shown in a step 710. When the output of a tag's counter/shift register 312 matches the tag lot number permanently programmed into lot number taps 314c, as indicated by the "yes" branch from step 712, the tag transmits its manufacturer number, as shown in a step 714. Alternatively, the reader could send out the count number, which the tag(s) uses to compare to its programmed time slot number.

In an alternative embodiment, the tag transmits a simple response signal as described above. Tag reader 104 then records the tag's lot number by storing the count in its counter/clock 406, as described above for the Tag ID.

If more than one tag transmits its lot number simultaneously, tag reader 104 detects the contention, as indicated by the "yes" branch from step 716, and tag reader 104 stores the contended manufacturer number for future contention resolution in a further read cycle, as shown in a step 718.

Tag reader 104 steps tags 102 through a predetermined range of possible lot numbers. When the last count is reached, as indicated by the "yes" branch from step 720, the process of steps 704 through 718 is repeated for the next contended manufacturer number. When the last contended manufacturer number has been examined, as indicated by the "yes" branch from step 722, the third read cycle is complete.

2.2 Immediate Read

Immediate read mode is used to read individual tags one at a time. In this mode, tag reader 104 transmits an instruction to a tag 102 that causes the tag to bypass the time slot counting operation and to immediately transmit its Tag ID number. This mode is useful for rapid Tag identification (on the order of milliseconds) when the individual tag rapidly passes through the reader zone. An example application is the reading of tags affixed to automobiles passing through an automatic toll booth.

2.3 Specific Tag Read

Specific tag read is used to determine whether one particular tag is present in an ensemble of tags. Tag reader 104 accomplishes this by transmitting the particular Tag ID, manufacturer number, and lot number of the tag 102 that is sought. Because a complete set of Tag identification parameters is transmitted, only the tag being sought should respond. This approach is useful for retrieving a specific tagged item from an ensemble of items, for example for locating a particular inventory item in a warehouse or retail store.

3.0 Tag Manufacture

Figure 8:
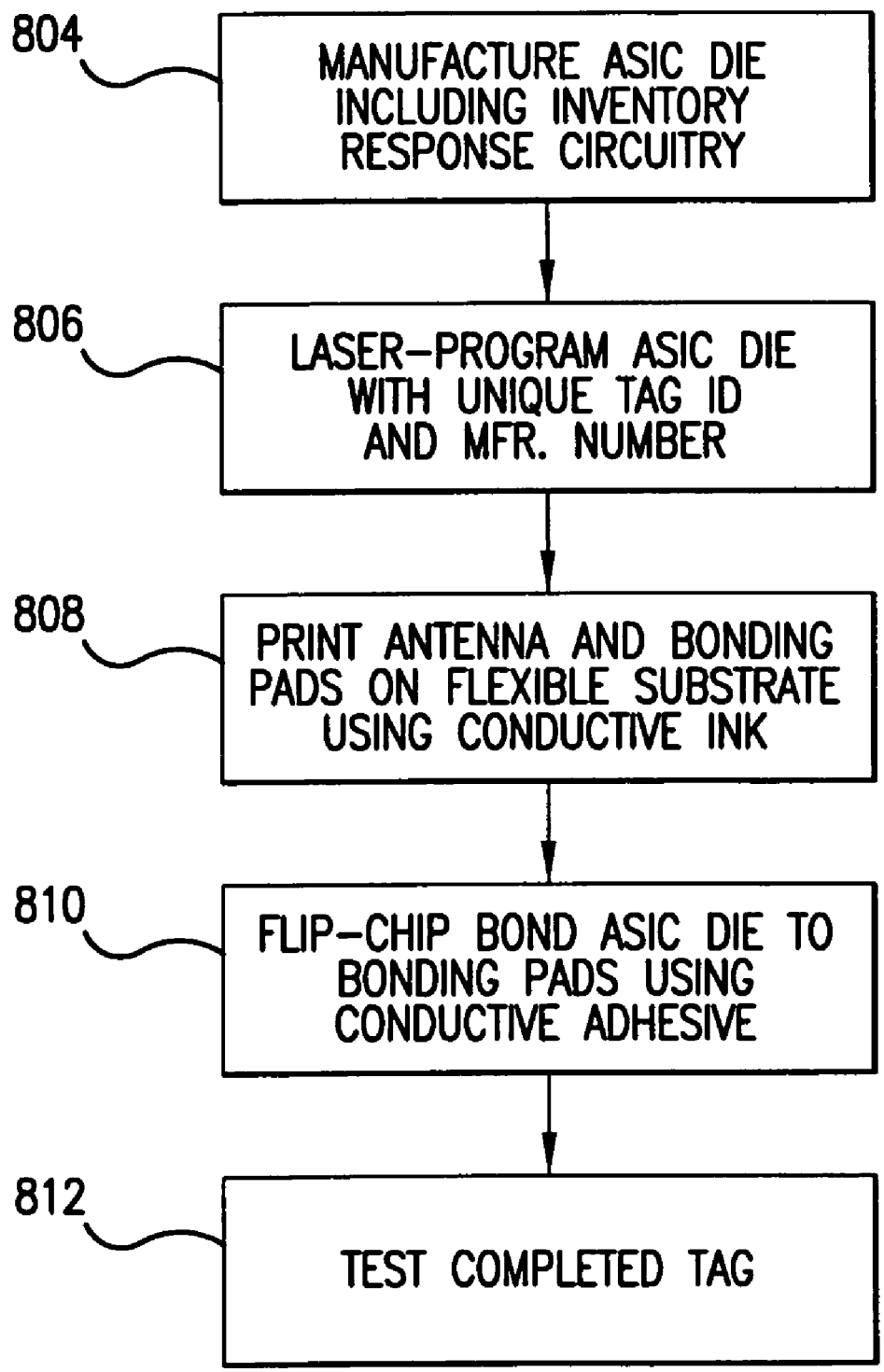
FIG. 8 is a flowchart depicting a method of manufacture for the RFID tag of the present invention.
Figure 9:
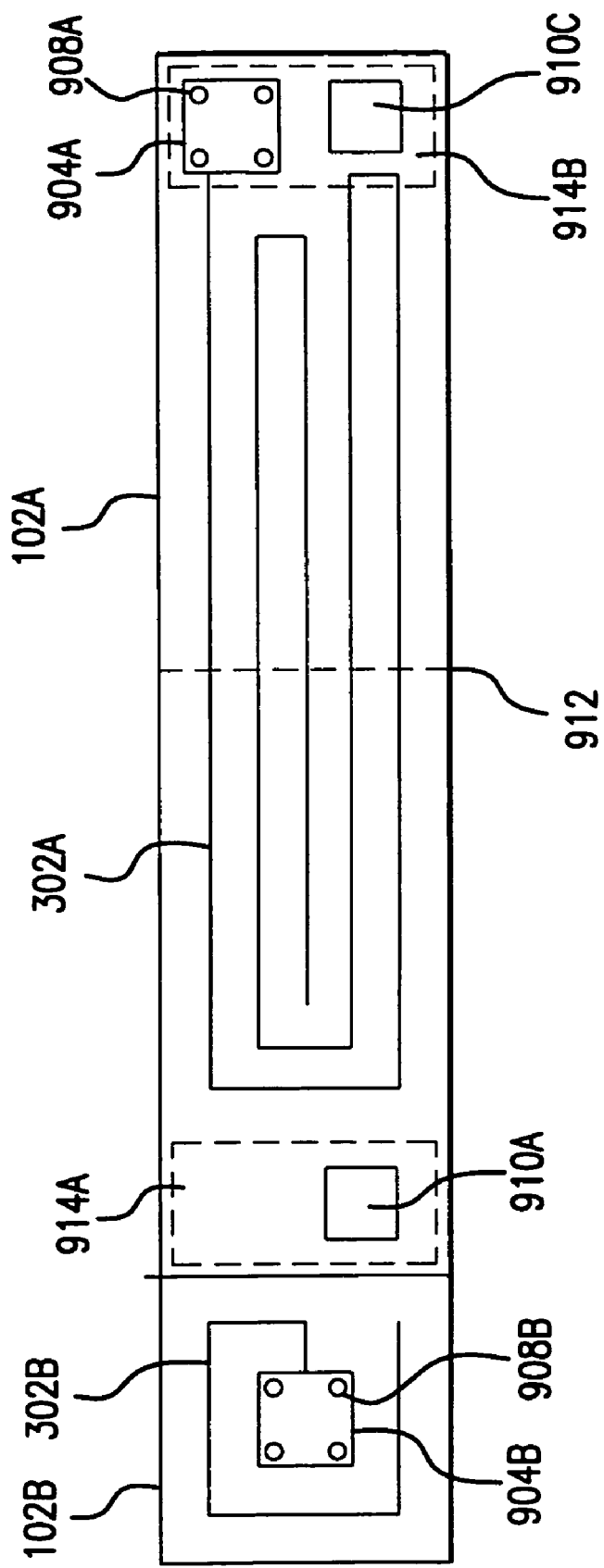
FIG. 9 depicts a pair of tags according to the present invention.

In order to be commercially viable, the RFID tags of the present invention must be inexpensive to manufacture. The present invention encompasses a unique method of manufacture to achieve this goal. FIG. 8 is a flowchart depicting a method of manufacture for the RFID tag 102 of the present invention. This method of manufacture is described with reference to the tag pair depicted in FIG. 9. FIG. 9 depicts a pair of tags 102a, 102b. Such a pair of tags is ideally suited for use in applications where two particular items need to be matched. In practice, tags 102a and 102b are separated by a person. Tag 102a is affixed to a first item, while tag 102b is affixed to a second item. In this way, the presence of both first and second items can be ensured. Each tag 102 includes an antenna 302 and an application-specific integrated circuit (ASIC) 904 mounted on bonding pads. Sensor 324 may be incorporated in ASIC 904. Alternatively, sensor 324 may be a separate component sharing the same substrate with other tag 102 components.

In one embodiment, tag 102a incorporates multiple tamper-resistant features. Tag 102a can be fixed to a first item by wrapping the tag about a portion of the item and joining tag portions 914a and 914b. In one embodiment, one area of 914 includes ASIC 904 so that attempting to separate areas 914a and 914b after joining destroys the ASIC and renders the tag inoperable. In another embodiment, tag 102a includes one or more perforated tear lines 912. Perforated tear lines 912 tear easily, so that any tampering with tag 102a causes the tag to separate at a tear line 912. This tearing provides an immediate visual indication of tampering. Tear lines 912 can be placed across critical portions of the tag circuitry, such as antenna 302a, such that tag separation along tear line 912 renders the tag inoperative.

As described above, tag 102 is powered by a power source, such as a battery, in one embodiment. In this embodiment, the battery may be formed by placing an anode 910a in one joining area 914a of the tag and placing a cathode 910c in the other joining area of the tag 914b. At least one of anode 910a and cathode 910c is coated with a electrolytic material and covered by a release liner. In another embodiment, tag 102 is powered by a capacitor. In that embodiment, at least one of anode 910a and cathode 910c is coated with a dielectric material and covered by a release liner. Other power sources may be used with tag 102 without departing from the spirit and scope of the present invention, as would be apparent to one skilled in the relevant art.

The two joining areas 914a,b of tag 102 are joined by removing the release liner and joining cathode 910c to anode 910a, thereby forming the power source of the tag. Any attempt to separate areas 914a,b after joining will destroy the power source formed by anode 910a and cathode 910c, thereby rendering the tag inoperative. In another embodiment, separating areas 914a,b after joining also gives a visual indication of tampering. For example, separating areas 914a,b could reveal a large "VOID" sign or some other image or break pattern.

Now the manufacture of tag 102 according to a preferred embodiment is described with reference to FIG. 8. In a step 804 one or more ASICs are manufactured. The ASICs include the inventory response circuitry depicted in FIG. 3. The circuitry includes the circuit elements of FIG. 3 except antenna 302. In one embodiment, all inventory response circuitry is contained upon a single ASIC. In another embodiment, RF circuitry is contained on one ASIC, and digital circuitry is contained on another ASIC. Then, in a step 806, the ASIC containing the digital inventory response circuitry is permanently programmed with at least the Tag ID and manufacturer number. In one embodiment the ASIC is also programmed with a lot number for the tag. In a preferred embodiment, these values are laser-programmed into taps 314a–314c, as described above.

Antenna 302 and bonding pads 908 are printed onto a flexible substrate using a conductive ink or material, as shown in a step 808. Such substrates are readily available from a variety of vendors. Such conductive inks are widely available. Finally, the ASIC is flip-chip bonded to bonding pads 908 using a conductive adhesive, as shown in a step 810. One such conductive adhesive is a "z-axis" adhesive, which is well-known in the relevant art and is commercially available. The use of such an adhesive is advantageous in that adhesive conducts only in the z-axis. Therefore, even if the adhesive is applied so as to inadvertently join two bonding pads, the two pads do not short together. In one embodiment the ASIC is also hermetically sealed. In a preferred embodiment, ASIC 904 is manufactured using silicon-on-insulator technology.

As mentioned above, a key consideration in the manufacture of tags 102 is cost. A large component of the cost of manufacture of such items is the cost of testing the ASICs to ensure operability. In a preferred embodiment of the present invention, operability testing is deferred until tag manufacture is complete, as shown in a step 812. Also in the preferred embodiment, tags 102 are manufactured in bulk on a long continuous strip of substrate. The strips can be rolled for easy packaging, delivery, and dispensing. Before packaging, the strip is passed through a testing apparatus, where each tag in the strip is tested for operability. However, rather than attempting to discard inoperable tags, inoperable tags are merely marked as inoperable and are retained on the strip. Then, when a person encounters a tag marked inoperable in a roll of tags, the person merely discards the inoperative tag. This process saves considerable cost, and allows the tags of the present invention to be manufactured very inexpensively.

4.0 Example Applications

The present invention is ideally suited to use in real time inventory control and electronic article surveillance. In a retail clothing store, for example, a tag can be attached to each article of clothing on display. One or more tag readers can then be used to maintain an inventory of the clothing articles. For example, a tag reader can be placed on each rack or display of clothing. Periodic reads of the rack or display can disclose exactly when an item is removed.

Tag readers placed at the exits to the store can prevent shoplifting. In this example, each item bears a tag. Because the tags are extremely small, they can be placed within an article so as to prevent removal or even discovery. For example, a tag could be placed within a label, button or seam of a garment, the plastic center of a compact disk, or the case of a videocassette, to facilitate both overt and covert operation.

The store maintains an inventory database of all the articles within the store. Each entry in the database represents a garment and contains the Tag ID of the tag embedded in the article. The entry also indicates whether the item has been purchased. When a tag of an unpurchased article is detected by a door reader, an alarm is sounded, indicating that the article is being shoplifted.

When an item is purchased, its tag ID is removed from the inventory database. Therefore, when a tag attached to a purchased article moves past the door reader, no alarm is sounded. Used alone or with security cameras, the present invention provides an effective tool to combat shoplifting.

In another embodiment, the present invention could be used to implement an "unattended store," i.e. one with no salespersons or clerks. A customer could enter the store, select items and go to a purchasing area. In the purchasing area, a tag reader would identify the customer's selections. The customer would then be presented with a bill. The customer could pay the bill with a credit card, whereupon the unattended store would remove the purchased item from its inventory database. The customer could then leave the store with the purchases. Alternatively, instead of presenting the customer with a bill, an account like a credit card account, store account, or debit account could be automatically charged, debited, or authenticated.

5.0 Example Instruction Set

Now an instruction set is described that can be used with the present invention. As would be apparent to one skilled in the relevant art, other instructions can be employed with the present invention without departing from its spirit and scope. In a preferred embodiment, the reader sends an instruction stream to the tag instruction register that is Nir bits long, where Nir is the number of stages in the instruction register. The instructions have the following data field format and symbolic binary values:

Np: Preamble: alerts the tags that the reader is starting communication. This data field is useful to prevent spurious noise from "spoofing" the tags and to initialize and synchronize the tag clock. The preamble starts with a long stream of "0" pulses from the reader, which starts the tag clock and initializes the tag instruction register. The 0's are followed by Np bits of a series of "1's", which alerts the tag that a reader instruction is following. Between instruction words, the reader sends out 0's for tag clock generation. When the preamble is present, the symbolic binary for this field is "1". A "0" represents the absence of the preamble.

Nw: Last instruction/in process/wake up: This data field is useful for dynamic read environments, where tags are moving into and out of the read zone, and prevents tags entering the read zone during a read cycle from erroneous communication. These tags will be "woken up" at the next read cycle to properly be identified. The "last instruction" subfield notifies the tag to shut down. The symbolic binary form for this field is:

| | |
|---|---|
| First Instruction Alert: | 001 |
| Subsequent instructions after wake up: | 010 |
| Last instruction; shut down: | 100 |

Nt; Timed read cycle: Second read/first read: This field instructs the tag to go into the specified timed read cycle (first, second or third), with the following symbolic binary form:

| | |
|---|---|
| No timed read: | 000 |
| First read: | 001 |
| Second read: | 010 |
| Third read: | 100 |
| Specific read: | 111 |

Ni; Immediate read: When the symbolic binary form is "1", this field instructs the tag to immediately send out its ID number.

Nr; Specific tag read: When the symbolic binary form is "1", this field instructs the tag to go into the specific tag read mode as designated by Nt, above. The reader will cycle through three instructions to set the tag to the proper state. The first is with Nt=001 and sets the Tag ID counter for the targeted tag. The second is with Nt=010 and sets up the second counter with the targeted manufacturer number. The third is with Nt=100 and sets up the third counter with the targeted lot number. Then the reader sends out clock with Nt=111 to read only the targeted tag at every clock instruction.

Nm; Clock/Count: This field sets the counter shift registers (SR's) into either the clocked mode to increment the counter by the next clock signal, or into the SR mode, awaiting the following time slot, wafer/lot number, or date instruction stream. It has the symbolic binary form:

| | |
|---|---|
| Clocked mode: | 01 |
| Specific count: | 10 |

Ns; Clock signal/time slot. This data field contains either specific counter instruction data, or a stream of zeroes if the tag is being instructed into the count mode. The symbolic binary form is "1" when there is a specific counter instruction, and "0" for the count mode. When Nm=01 and Ns=0, a clock instruction counter, Nc, is enabled.

Nc: Clock instruction signal to increment counter/shift registers 312. The symbolic binary form is:

| | |
|---|---|
| No clock instruction: | 00 |
| Clock: | 01 |
| Last clock: | 11 |

The clock instruction counter, Nc, allows the reader to "short cycle" the tag through the count sequence, bypassing the Nir instruction sequence, which can be as long as 32, 48, or 64 bits. Nc, on the other hand, could theoretically be as short as 2 bits, although 4 bits is implemented here. Once the clock instruction is sent out, the reader waits for a tag response. If none comes within a specified time frame, it sends out another clock instruction. When a tag responds with its ID number, the reader waits until the ID number transmission is completed before sending out the next clock instruction. If only a few tens to a few hundreds of tags are in the ensemble, this "short cycle" clocking can accelerate tag read time by as much as a factor of 10. On completing the clock read cycle, the full instruction register will be re-enabled for the next sequence of instructions from the reader, such as for any required contention resolution, or for tag shut down.

When the reader is "short cycling" the tags by simply sending out clock instructions, spurious RF could cause a tag to lose its count. This will be detected by the reader when the tag responds with its full ID because the count will not match the received ID. If there is no contention when this occurs, the reader will successfully read this tag. If such contention occurs due to one or more tags losing their count, the reader could resolve this contention by sending out the time slot number and working backwards in time slots until this contention problem is resolved.

The n-bit instruction stream is organized as follows: Nir=Nc/Ns/Nm/Nr/Ni/Nt/Nw/Np, with each field comprised of sub-fields in the format described above. This provides the generalized symbolic binary form of Nir=xx/x/xx/x/x/xxx/xxx/x where the x's represent either 1's or 0's.

As described above, this instruction stream comprises 21 states. However, according to the present invention, other states can exist. As is apparent to persons skilled in the relevant arts, these 21 states can be described by 5 bits. The bits necessary to hold the contents of a specific read count preferably requires 12 bits. Therefore, according to this instruction set, a 17 bit instruction stream is required. However, an embodiment of the present invention comprises error correction coding that would increase the required size of the instruction stream.

Also, as described above, the instruction stream is interpreted by each tag's instruction interpreter 310. Instruction interpreter 310 can be implemented with a bit register. Using the 21 state example instruction set described above, a 17 bit register is required. However, instruction interpreter may employ other size bit registers. In addition, instruction interpreter 310 can be implemented with a comparator, software, a hardwired state machine, or any combination thereof.

An example instruction stream is shown below for each operational mode of the tag. The 1's represent a resulting action or state directed by an instruction sub-field while 0's represent the off state of an instruction sub-field.

| Timed Broadcast Read: | Nc / Ns / Nm / Nr / Ni/ Nt / Nw / Np |
|---|---|
| Initialization: | 00 / 0 / 00 / 0 / 0 / 000 / 000 / 0 |
| First instruction of first read cycle: | 00 / 0 / 01 / 0 / 0 / 001 / 001 / 1 |
| Following instructions of first read cycle: | 01 / 0 / 01 / 0 / 0 / 001 / 010 / 1 |
| Last clock instruction: | 11 / 0 / 01 / 0 / 0 / 001 / 010 / 1 |
| First instruction for second cycle: | 00 / 1 / 10 / 1 / 0 / 010 / 010 / 1 |
| Following instructions for second cycle: | 01 / 0 / 01 / 0 / 0 / 010 / 010 / 1 |
| Last clock instruction for second cycle: | 11 / 0 / 01 / 0 / 0 / 010 / 010 / 1 |
| First instruction for third cycle: | 00 / 1 / 10 / 1 / 0 / 100 / 010 / 1 |
| Following instructions for third cycle: | 01 / 0 / 01 / 0 / 0 / 100 / 010 / 1 |
| Last clock instruction: | 11 / 0 / 01 / 0 / 0 / 100 / 010 / 1 |
| Last instruction (tags turn off): | 00 / 0 / 00 / 0 / 0 / 000 / 100 / 1 |
| Immediate Read: | Nc / Ns / Nm / Nr / Ni / Nt / Nw / Np |
| Initialization: | 00 / 0 / 00 / 0 / 0 / 000 / 000 / 0 |
| First instruction: | 00 / 0 / 00 / 0 / 1 / 000 / 001 / 1 |
| Next and last instruction (tag turns off): | 00 / 0 / 00 / 0 / 0 / 000 / 100 / 1 |
| Specific Tag Read: | Nc / Ns / Nm / Nr / Ni / Nt / Nw / Np |
| Initialization: | 00 / 0 / 00 / 0 / 0 / 000 / 000 / 0 |
| First instruction: | 00 / 1 / 10 / 1 / 0 / 001 / 001 / 1 |
| Second instruction: | 00 / 1 / 10 / 1 / 0 / 010 / 010 / 1 |
| Third instruction: | 00 / 1 / 10 / 1 / 0 / 100 / 010 / 1 |
| Following clock instructions: | 01 / 0 / 01 / 1 / 0 / 111 / 010 / 1 |
| Last clock instruction: | 11 / 0 / 01 / 0 / 0 / 111 / 010 / 1 |
| First instruction of next specific read: | 00 / 1 / 10 / 1 / 0 / 001 / 010 / 1 |
| Second instruction of next read: | 00 / 1 / 10 / 1 / 0 / 010 / 010 / 1 |
| Third instruction of next read: | 00 / 1 / 10 / 1 / 0 / 100 / 010 / 1 |
| Following clock instructions: | 01 / 0 / 01 / 1 / 0 / 111 / 010 / 1 |
| Last clock instruction: | 11 / 0 / 01 / 0 / 0 / 111 / 010 / 1 |
| Last instruction (tag turns off): | 00 / 0 / 00 / 0 / 0 / 000 / 100 / 1 |

6.0 Interrogation Optimization

The Timed Broadcast Mode of operation described herein is an example of contention resolution through multiple read cycles. The present invention provides a technique for defining a plurality of read cycles so that the aggregate number of counts through the cycles is minimized. This minimization shortens the time required to perform contention resolution. Thus, the present invention advantageously enables tag interrogation applications, such as automatic real time inventory control, to be performed quickly as well as more frequently.

For interrogations that provide unique identification, each tag has a distinct tag address. For multiple read cycle interrogations, these addresses are decomposed into a plurality of sub-addresses, such as tag ID, manufacturing number, and lot number. Each sub-address corresponds to a particular read cycle of a multiple read cycle interrogation according to protocols, such as the timed broadcast mode. Using the timed broadcast mode description above as an example, a tag ID sub-address is allocated to a first read cycle, a manufacturing number sub-address is allocated to a second read cycle, and a lot number sub-address is allocated to a third read cycle.

A read cycle is defined by its sequential order with respect to other read cycles and by its number of time slots. Thus, in the example provided above, the three read cycles occur in a predetermined order, and each of these cycles has a number of time slots that correspond to a portion of an address space. This address space provides for the unique identification of a tag population through the use of a predetermined number of available Tag IDs, a predetermined number of available manufacturing numbers, and a predetermined number of available lot numbers. (Again, the Tag ID, manufacturing number and lot number can be considered a single, unique address, which has three subaddresses.)

A challenge to interrogation protocols involves the ability to quickly interrogate a tag population. An address space can accommodate a large number of tags 102. For example, an address space that provides 10,000 time slots for each of three read cycles can support a tag population having as many as a trillion tags 102. Often, only a portion of an address space is occupied by a tag population. For instance, if a tag population of one thousand tags is interrogated by an RFID system that uses such an address space, only a billionth of the one trillion available addresses would be occupied.

The present invention provides techniques that flexibly define an address space to optimize multiple read cycle interrogations. This involves decomposing an address space into a plurality of read cycles that each have a distinct number of time slots. The number of time slots for each read cycle is designed to provide optimal interrogation efficiency for a particular tag population. In addition, the number of time slots allocated to each read cycle can be adaptively changed based on measured efficiency.

These techniques are described with reference to a tag population having a number of tags, m. Interrogation of this population is performed through N read cycles to provide contention resolution. Each read cycle has a number of time slots, $n_i$, where i is an index that designates a particular read cycle. For each read cycle, i, the number of time slots, $n_i$, is set to optimize the interrogation process.

6.1 Address Spaces

FIGS. 11–14 are graphical representations of three-dimensional address spaces. Each dimension corresponds to a particular read cycle. The use of three dimensions is for illustrative convenience only. The present invention can include address spaces having any number of dimensions (i.e., any number of read cycles). Each of these address spaces represents various allocations of time slots to three read cycles, where each dimension corresponds to a particular read cycle. Each of these three-dimensional address spaces demarcates a volume. The magnitude of this volume defines the number of tags 102 that the address space can uniquely identify. For each address spaces described with reference to FIGS. 11–14, these volumes are equal.

Figure 11:
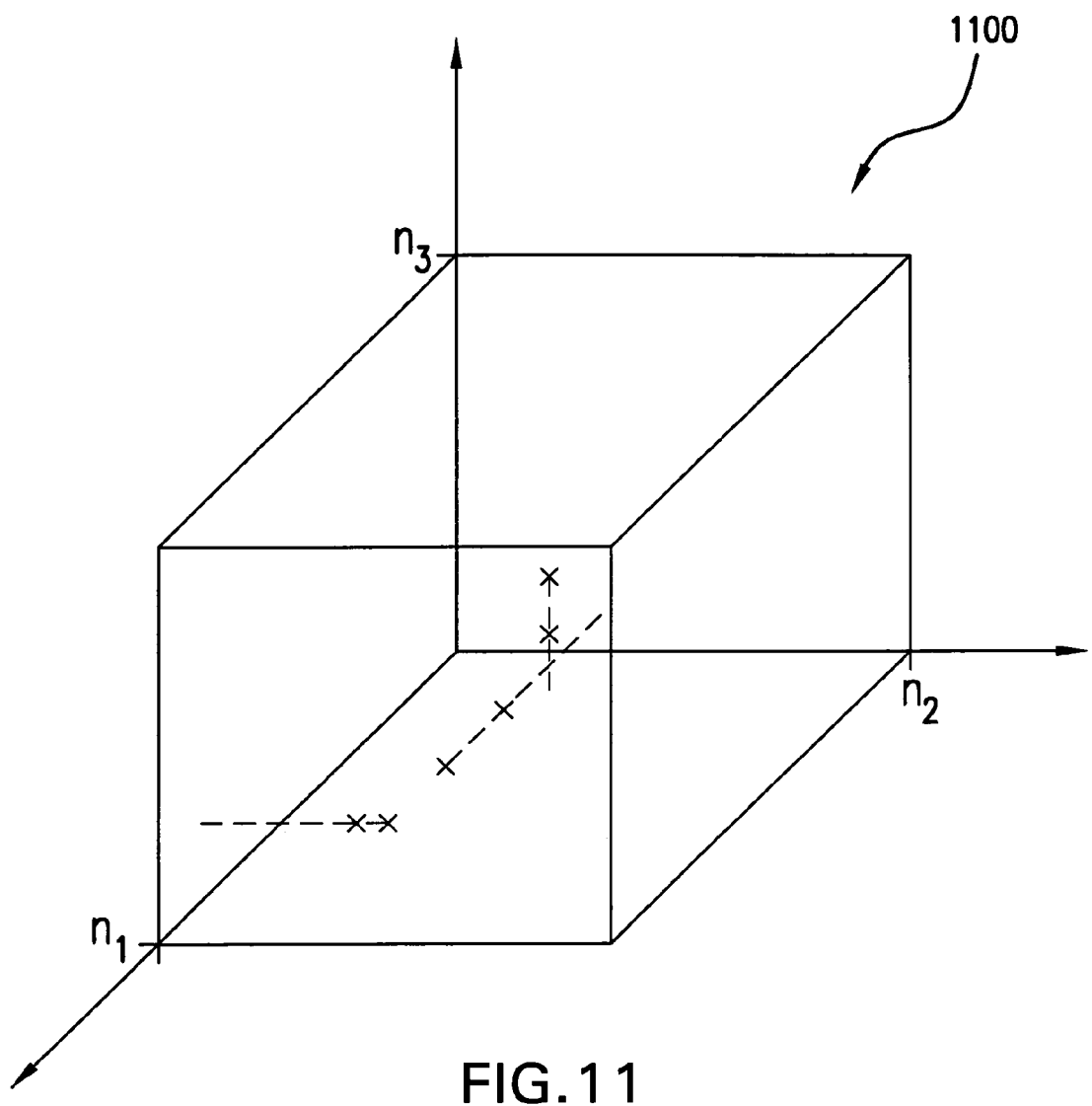
FIGS. 11–14 are graphical representations of three-dimensional address spaces.

FIG. 11 illustrates a three dimensional representation of an address space 1100 having a uniform number of time slots for three read cycles. Thus, for uniform address space 1100, the following relationship exists:

$n_1 = n_2 = n_3$.

Figure 12:
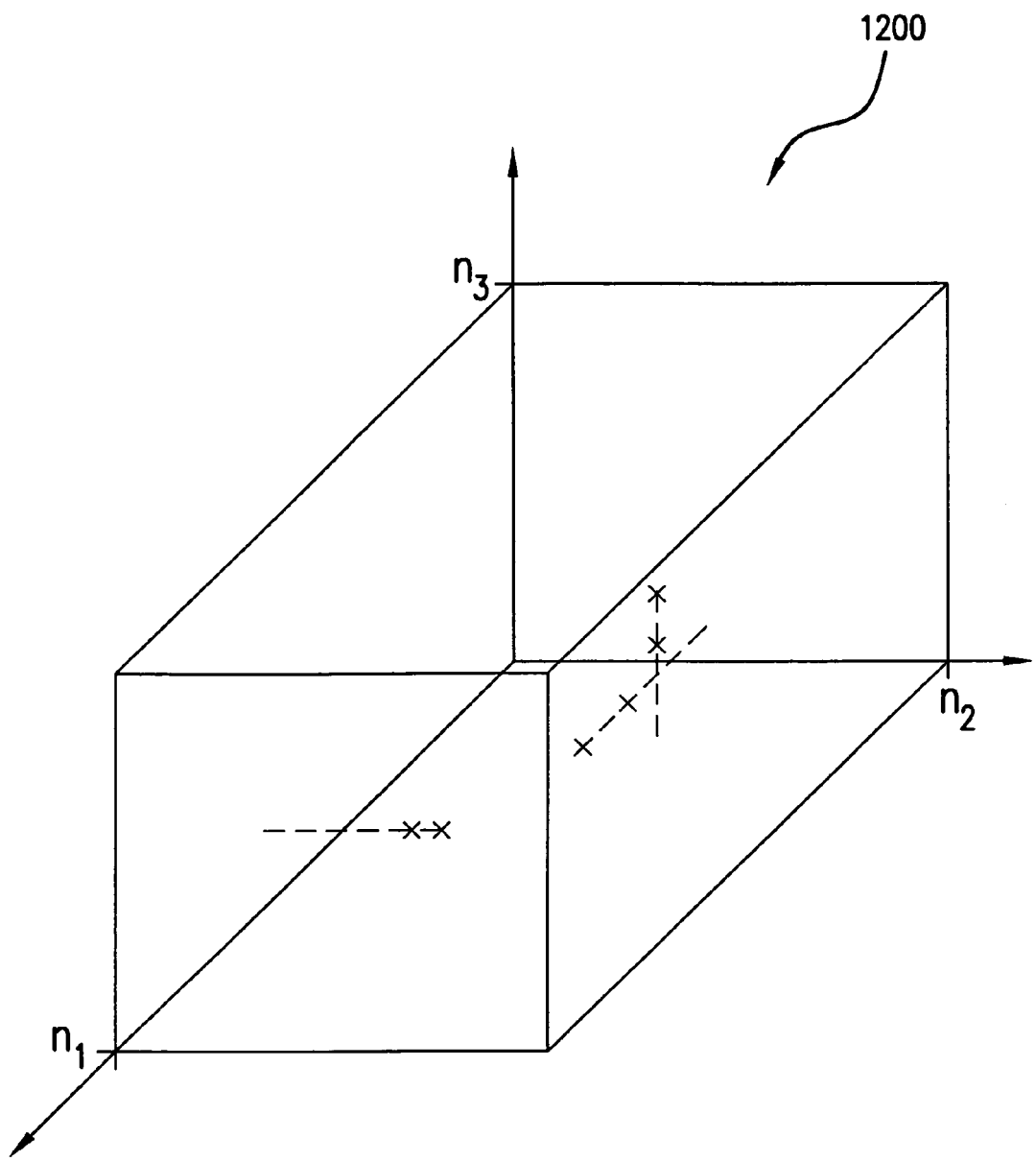
Figure 13:
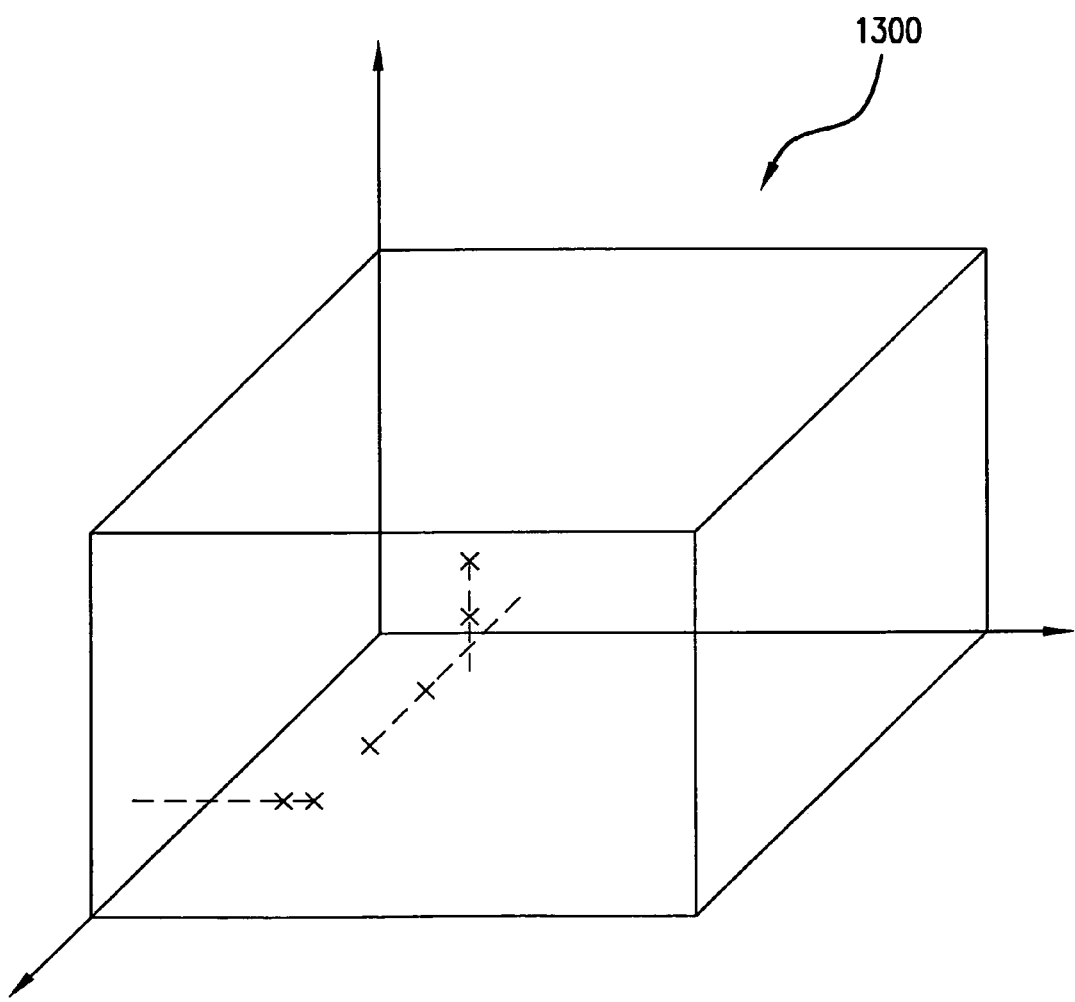
Figure 14:
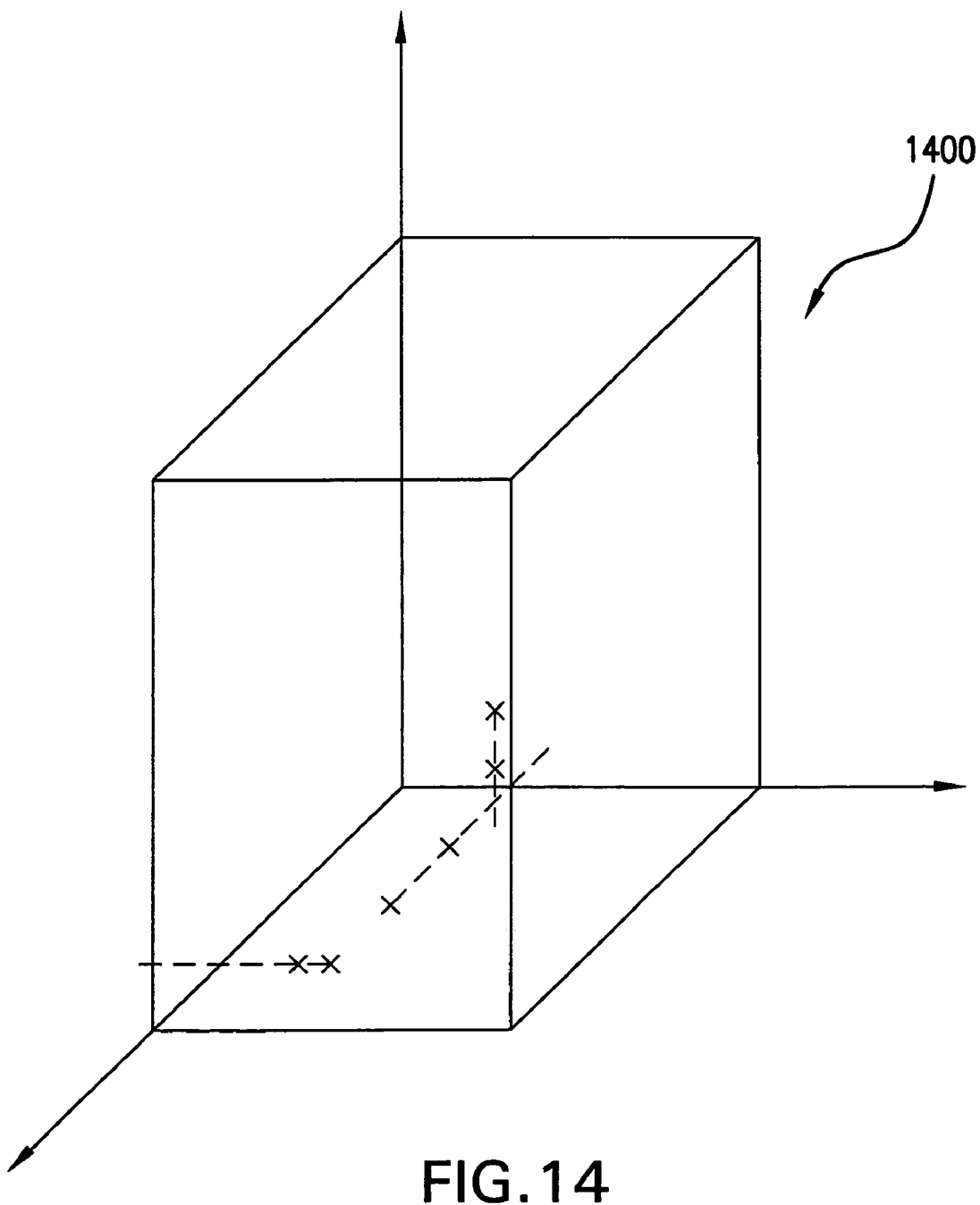

According to the present invention, one or more dimensions of a multidimensional address space are altered to match the tag population that is being interrogated. Thus, for each altered dimension (i.e., read cycle), the corresponding number of time slots is reduced to eliminate unnecessary iterations or counts through empty addresses. FIGS. 12–14 show how address spaces can be altered.

FIG. 12 illustrates a three dimensional representation of a first altered address space 1200. Address space 1200 is expanded in the first dimension.

Thus, the first read cycle has more time slots than the second and third read cycles. Accordingly, for address space 1200, the following relationships exist:

$n_1 > n_2$; and $n_1 > n_3$.

FIG. 13 illustrates a three dimensional representation of a second altered address space 1300. Altered address space 1300 is expanded in the second dimension. Therefore, the second read cycle has more time slots than the first and third read cycles. Accordingly, for address space 1300, the following relationships exist:

$n_2 > n_1$; and $n_2 > n_3$.

FIG. 14 illustrates a three dimensional representation of a third altered address space 1400. Altered address space 1400 is expanded in the third dimension. Therefore, the third read cycle has more time slots than the first and second read cycles. Accordingly, for address space 1400, the following relationships exist:

$n_3 > n_1$; and $n_3 > n_2$.

6.2 Interrogation Efficiency

The present invention advantageously provides enhanced interrogation efficiency. Interrogation efficiency is a performance metric determined by comparing the actual time it takes to perform an interrogation against a minimum possible interrogation time. Minimum possible interrogation time is the time required to perform an interrogation when no contention occurs. Thus, for a tag population having m tags, minimum interrogation time is achieved when the identity of all m tags are resolved in the first read cycle. Interrogation efficiency is calculated according to the following equation:

$E = T_{min}/T_{actual}$, where:

E is interrogation efficiency;

$T_{actual}$ is the actual time it takes to perform an interrogation of a tag population; and $T_{min}$. Is the minimum possible time required interrogation the same tag population.

Interrogation efficiency can be calculated from probability models that, the expected number of contention errors in a particular read cycle, i, is expressed by the term $n_{C_i}$, which is approximated by the following relationships:

$$n_{c_i} = \frac{n_i}{\left(1 + \frac{n_i}{m_i}\right)^2}$$

$$m_{c_i} = \frac{m_i\left(1 + \frac{2n_i}{m_i}\right)}{\left(1 + \frac{n_i}{m_i}\right)^2}$$

and $m_i = \frac{m_{c_{i-1}}}{n_{c_{i-1}}}$ for $m \geq 2$

-continued where $m_i = m$.

Actual interrogation time is calculated from $C_i$ according to the following relationship:

$$T_{actual} = T_s \left[ n_1 + \sum_{i=2}^{N} n_i \prod_{j=1}^{i-1} n_{c_j} \right], \text{ where:}$$

,where $T_{actual}$ is actual interrogation time;
$T_s$ is the interrogation time per time slot;
$n_i$ is the number of time slots for read cycle i; and
$n_{C_j}$ is the expected number of contentions for read cycle j.

The above relationship is based on probability models that are apparent to persons skilled in the relevant art(s).

Assuming a random tag distribution, the vendor can calculate the probable number of tags from:

$$m = \frac{n_1 \sqrt{\frac{n_{Ci}}{n_1}}}{\sqrt{1 - \sqrt{n_{Ci}/n_1}}}$$

The present invention advantageously allows for the creation of various efficiency profiles. However, each of these various efficiency profiles provides optimal interrogation efficiency for different size tag populations. One technique of providing optimal interrogation efficiency involves adjusting the number of time slots allocated to the first read cycle.

6.3 Static Optimization

Figure 15:
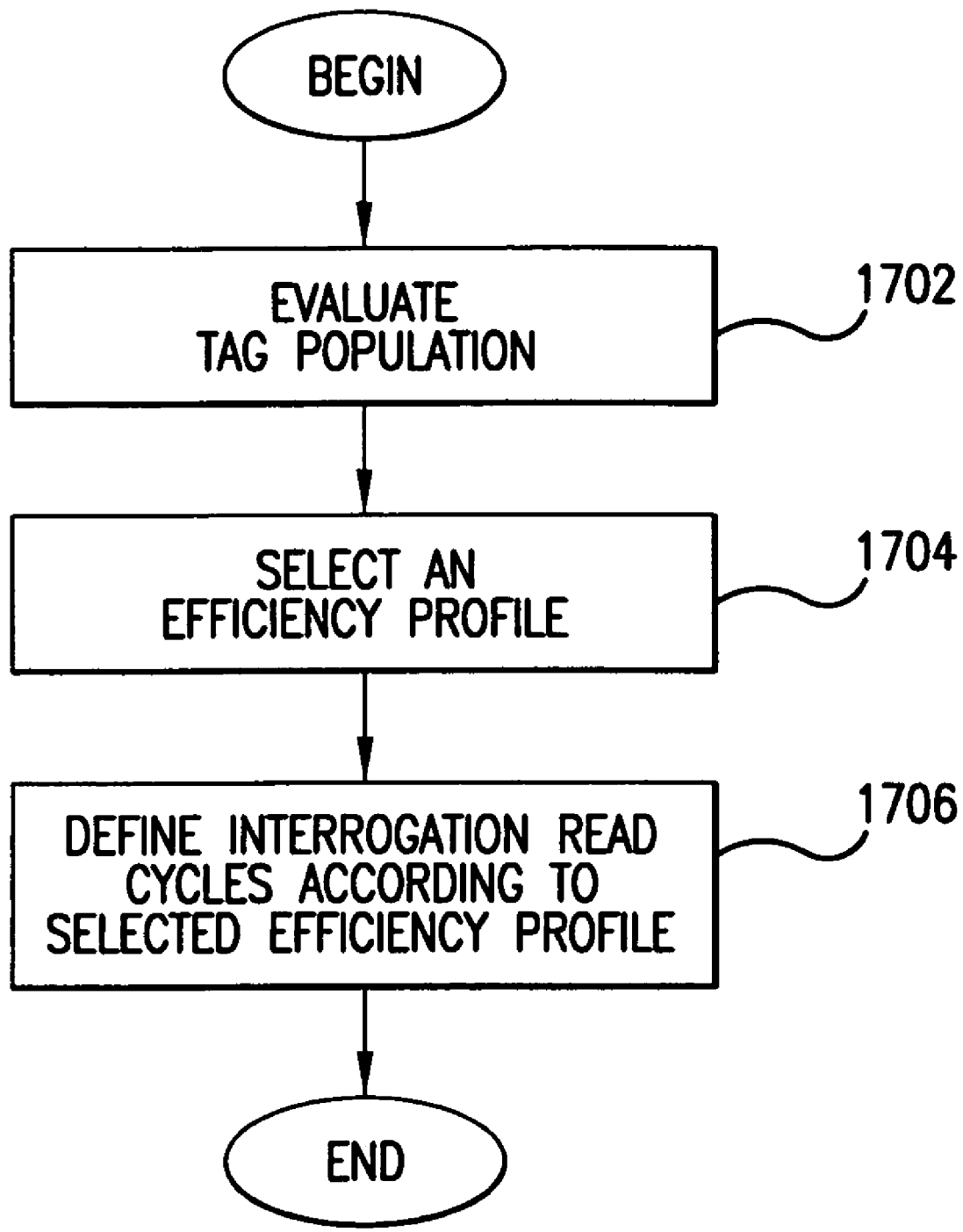
FIG. 15 is a flowchart illustrating a static optimization operation.

FIG. 15 is a flowchart illustrating a static optimization operation. This operation is used to optimize a tag interrogation process that uses multiple read cycles.

In a step 1502, an expected tag population is estimated for a given application. This step comprises estimating a normal value of m.

Next, in a step 1504, an efficiency profile is selected that matches the estimate performed in step 1502. Large number statistics used here show that $n_1=1.21$ sqrt(m) is an optimal selection, with $n_2=0.5\ n_1$, and $n_3=2$, and subsequent read cycles set at 2 time slots each. This is one example of an optimization scheme. Other statistical assumptions would yield different optimization results.

After step 1504, a step 1506 is performed. In this step, interrogation read cycles are defined according to efficiency profile selected in step 1504. This step comprises the steps of setting the number of time slots allocated to one or more read cycles. These values may be pre-coded into a reader for particular application.

6.4 Dynamic Optimization

Figure 10:
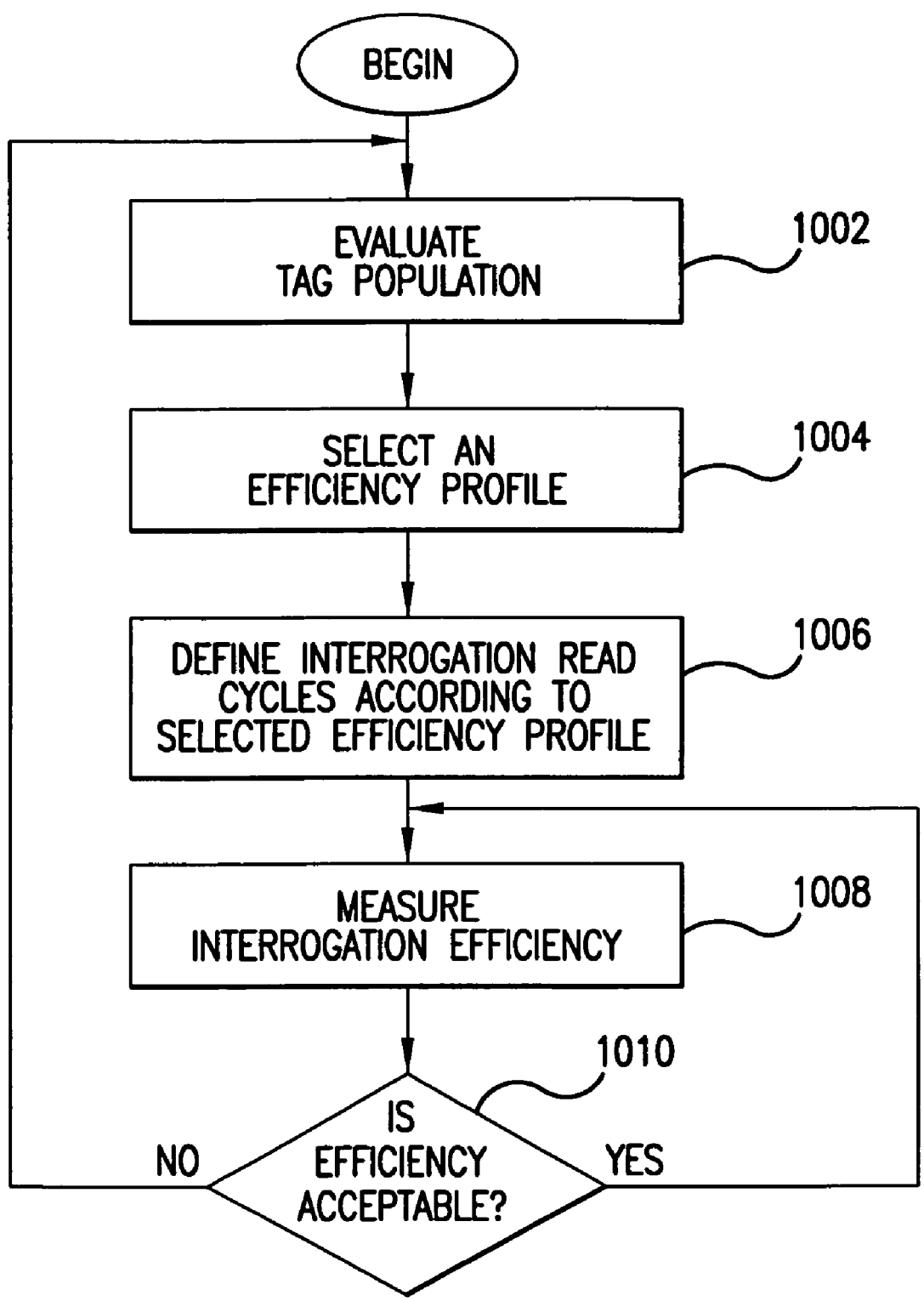
FIG. 10 is a flowchart illustrating a dynamic optimization operation.

FIG. 10 is a flowchart illustrating a dynamic optimization operation. This operation is used to optimize a tag interrogation involving a plurality of interrogations that employ multiple read cycles. FIG. 10 is described with reference to the interrogation scenario shown in FIG. 1, which includes a reader 104 interrogating a tag population that includes a plurality of tags 102A–102G.

In a step 1002, an unknown tag population is dynamically evaluated. This step comprises setting a first guess for $n_1=n_{10}$. The probable tag distribution is calculated from $m=\{n_{10}\text{sqrt}(n_{C_1}/n_{C_{10}})/[1-\text{sqrt}(n_{C_1}/n_{10})]\}$, and $n_1$ is then set to $n_1=1.21$ sqrt(m).

Next, in a step 1004, an efficiency profile is selected that matches the evaluation performed in step 1002. As with the use for static optimization, setting $n_2=0.5\ n_1$, and $n_i=2$ for i=3 to N yields maximum efficiency (greater than 80%). Alternatively, a fixed number of time slots for $n_1$ can be queried with varying "step" sizes. For example, if $n_1$ comprised of 1024 time slots, the reader could interrogate the first cycle in 8 steps each comprising 128 time slots. It would then calculate m for the resulting contention value, $n_{C_1}$, and set subsequent step sizes accordingly.

After step 1004, a step 1006 is performed. In this step, interrogation read cycles are defined according to efficiency profile selected in step 1004. This step comprises the steps of setting the number of time slots allocated to one or more read cycles.

A step 1008 follows step 1006. In step 1008, interrogation efficiency is measured. This measurement is performed over a measurement epoch. A measurement epoch is one interrogation (i.e., one iteration through one or more read cycles to identify each tag in a tag population). However, an interrogation epoch can be a plurality of interrogations.

After step 1008, a step 1010 is performed. In step 1010, reader 104 determines whether the interrogation efficiency measured in step 1008 is acceptable. This step comprises determining whether the measured interrogation efficiency is greater than a predetermined threshold. If the measured interrogation efficiency is acceptable (e.g, greater than a predetermined threshold), then operation proceeds to step 1008, where interrogation efficiency will be measured in future interrogation epochs. Otherwise, if the measured interrogation efficiency is not acceptable, then operation proceeds to step 1002, where the measured efficiency is used to perform tag population evaluation.

6.5 Exemplary Address Space

In an embodiment, each tag in a tag population is uniquely marked with a set of sub-addresses that are associated with a various aspects of a tag or product manufacturing process. This approach enables sub-addresses to repeat in a predictable way within a manufacturing process. An example of such an addressing convention is provided below in Table 3. In addition to encoding manufacturing information, this addressing convention includes a sub-address that corresponds to product type. For a tag, product type indicates the object that the tag is to be attached. An exemplary scheme used for product type encoding is Universal Product Codes (UPCs). This convention accommodates approximately 1000 million different unique tag addresses.

TABLE 3

| Sub-address Field | Sub-address Description | Number of Time Slots | Number of Register Bits |
|---|---|---|---|
| 1 | Package hierarchy | 16 | 4 |
| 2 | Product type | 128 | 7 |
| 3 | A serial number that repeats several times over a single wafer. | 65,536 | 16 |
| 4 | A particular wafer number within a lot of wafers. | 64 | 6 |
| 5 | A number associated with a particular lot that includes a | 8 | 3 |

TABLE 3-continued

| Sub-address Field | Sub-address Description | Number of Time Slots | Number of Register Bits |
|---|---|---|---|
| | plurality of wafers. | | |
| 6 | Date of manufacture | 1024 | 10 |
| 7 | Plant ID number | 16 | 4 |
| | TOTALS | 1000 trillion | 50 |

The addressing convention above provides a scheme that enables manufacturing and product information to be determined from a tag address. However, this convention does not preclude utilization of the address space optimization techniques described herein.

The specific scheme of Table 3 is by way of example only. An alternative scheme could simply be the UPC code plus a serial number that gives uniqueness to all products within that particular UPC code. This and other schemes will be evident by those skilled in the art and would be included in the spirit and scope of the invention. An alternative scheme could simply be the UPC code plus a serial number that gives uniqueness to all products within that particular UPC code. This and other schemes will be evident by those skilled in the art and would be included in the spirit and scope of the invention.

Best efficiency in particular applications may be obtained through a hashing type code introduced into the first portions of the tag ID. The hashing code can be computed from the remainder of the tag address The use of a hashing code results in a near even distribution of tags in the first read cycles given any sparsely populated address space. One such example would be the use of a cyclic redundancy code (CRC). This is a preferable choice as it can also be used to fairly accurately detect transmission errors as well. Other hashing mechanisms for particular applications will be obvious to those skilled in the art and would be included in the spirit and scope of the invention.

7.0 Conclusion

While various embodiments of the present invention have been described above, it should be understood that they have been presented by way of example, and not limitation. It will be apparent to persons skilled in the relevant arts that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method of optimizing an interrogation of a tag population that includes a plurality of tags, wherein each of the plurality of tags is assigned a tag address, the method comprising the steps of:
   (a) estimating a tag population size;
   (b) selecting one of a plurality of efficiency profiles based on said estimated tag population size, wherein said efficiency profile defines a number of time slots allocated to one or more read cycles; and
   (c) selecting a different efficiency profile based on a duration of said one or more read cycles.

2. The method of claim 1, wherein step (b) comprises the step of aligning a maximum of one of the plurality of efficiency profiles with the estimated tag population size.

3. The method of claim 1, wherein each of the efficiency profiles provides interrogation efficiency metrics for a plurality of tag population sizes.

4. The method of claim 1, wherein step (b) comprises the step of allocating a number of time slots to a corresponding one of the plurality of read cycles.

5. The method of claim 1, wherein step (c):
   measuring interrogation efficiency during a measurement epoch;
   determining whether the measured interrogation efficiency is acceptable; and
   repeating steps (a) and (b) if the measured interrogation efficiency is not acceptable.

6. The method of claim 1, wherein step (c) comprises the steps of:
   measuring interrogation efficiency during a measurement epoch;
   determining whether the measured interrogation efficiency is acceptable; and
   repeating steps (a) and (b) if the measured interrogation efficiency is not acceptable.

7. The method of claim 5, wherein said measuring step comprises the step of calculating:

$E = T_{min}/T_{actual}$, wherein:

E is the interrogation efficiency;

$T_{actual}$ is the actual time taken to perform an interrogation of a tag population; and $T_{min}$ is the minimum possible time required to perform an interrogation of the tag population.

8. The method of claim 5, wherein the measurement epoch includes one or more interrogations.

9. The method of claim 1, wherein the tag address is a UPC code plus a serial number that give substantial uniqueness to all products within that particular UPC code.

10. The method of claim 1, wherein the tag address includes a first portion comprising a hashing code, which is computed from the remainder of the tag address.

11. The method of claim 10, wherein the hashing code is a cyclic redundancy check (CRC).

12. The method of claim 1, wherein said number of time slots in a first read cycle is different than said number of time slots in a second read cycle for said selected efficiency profile.

13. The method of claim 1, wherein said tag address includes a plurality of a sub-address.

14. A system for optimizing an interrogation of a tag population that includes a plurality of tags, wherein each of the plurality of tags is assigned a tag address, comprising:
   means for estimating a tag population size;
   means for selecting one of a plurality of efficiency profiles based on said estimated tag population size, wherein said efficiency profile defines a number of time slots allocated to one or more read cycles; and
   means for selecting a different efficiency profile based on a duration of said one or more read cycles.

15. The system of claim 14, wherein said selecting one of a plurality of efficiency profiles means comprises means for aligning a maximum of one of the plurality of efficiency profiles with the estimated tag population size.

16. The system of claim 14, wherein each of the efficiency profiles provides interrogation efficiency metrics for a plurality of tag population sizes.

17. The system of claim 14, wherein said means for selecting one of a plurality of efficiency profiles comprises means for allocating a number of time slots to a corresponding one of the plurality of read cycles.

18. The system of claim 14, wherein said means for selecting a different efficiency profile comprises:
- means for measuring interrogation efficiency during a measurement epoch; and
- means for determining whether the measured interrogation efficiency is acceptable.

19. The system of claim 18, wherein the determining means comprises means for determining whether the measured interrogation efficiency is greater than a predetermined threshold.

20. The system of claim 18, wherein said measuring means comprises the means for calculating:

$E = T_{min}/T_{actual}$, wherein:

E is the interrogation efficiency;

$T_{actual}$ is the actual time taken to perform an interrogation of a tag population; and $T_{min}$ is the minimum possible time required to perform an interrogation of the tag population.

21. The system of claim 18, wherein the measurement epoch includes one or more interrogations.

22. The system of claim 14, wherein the tag address is a UPC code plus a serial number that give substantial uniqueness to all products within that particular UPC code.

23. The system of claim 14, wherein the tag address includes a first portion comprising a hashing code, which is computed from the remainder of the tag address.

24. The system of claim 23, wherein the hashing code is a cyclic redundancy check (CRC).

25. The system of claim 14, wherein said number of time slots in a first read cycle is different than said number of time slots in a second read cycle for said selected efficiency profile.

26. The system of claim 14, wherein said tag address includes a plurality of a sub-address.

* * * * *

UNITED STATES PATENT AND TRADEMARK OFFICE
CERTIFICATE OF CORRECTION

PATENT NO. : 7,009,496 B2  Page 1 of 1
APPLICATION NO. : 10/403019
DATED : March 7, 2006
INVENTOR(S) : Michael R. Arneson and William R. Bandy It is certified that error appears in the above-identified patent and that said Letters Patent is hereby corrected as shown below:

In column 18, line 50, "Tmin. Is" should be replaced with -- Tmin is--;

In column 22, lines 10 through16 should be deleted;

In column 22, line 17, "6" should be replaced with --5--; and

In column 22, after line 24, the following claim should be entered: --6. The method of claim 5, wherein the determining step comprises the step of determining whether the measured interrogation efficiency is greater than a predetermined threshold.--.

Signed and Sealed this

Eighth Day of August, 2006

JON W. DUDAS
*Director of the United States Patent and Trademark Office*